(12) United States Patent
Wokurka et al.

(10) Patent No.: US 9,799,229 B2
(45) Date of Patent: Oct. 24, 2017

(54) DATA SHARING SYSTEM FOR AIRCRAFT TRAINING

(71) Applicant: The Boeing Company, Chicago, IL (US)

(72) Inventors: John Wokurka, Fenton, MO (US); Kenn R. Luecke, St. Peters, MO (US); David K. Liefer, St. Peters, MO (US)

(73) Assignee: THE BOEING COMPANY, Chicago, IL (US)

( * ) Notice: Subject to any disclaimer, the term of this patent is extended or adjusted under 35 U.S.C. 154(b) by 558 days.

(21) Appl. No.: 13/713,175

(22) Filed: Dec. 13, 2012

(65) Prior Publication Data

US 2014/0170601 A1 Jun. 19, 2014

(51) Int. Cl.
| | | |
|---|---|---|
| *G09B 9/00* | (2006.01) | |
| *G09B 9/30* | (2006.01) | |
| *G09B 9/02* | (2006.01) | |
| *G09B 9/06* | (2006.01) | |
| *H04W 12/00* | (2009.01) | |
| *H04W 12/04* | (2009.01) | |
| *H04W 12/06* | (2009.01) | |
| *H04W 12/08* | (2009.01) | |
| *H04W 12/10* | (2009.01) | |
| *G06Q 10/10* | (2012.01) | |

(52) U.S. Cl.
CPC .............. *G09B 9/003* (2013.01); *G09B 9/02* (2013.01); *G09B 9/06* (2013.01); *G09B 9/302* (2013.01); *G06Q 10/107* (2013.01)

(58) Field of Classification Search
CPC ................ G06F 3/044; G09B 9/165

USPC ........................................... 434/35
See application file for complete search history.

(56) References Cited

U.S. PATENT DOCUMENTS

| | | | |
|---|---|---|---|
| 4,914,697 A * | 4/1990 | Dabbish et al. ................ 380/28 |
| 5,807,109 A | 9/1998 | Tzidon et al. |
| 7,098,913 B1 | 8/2006 | Etherington et al. |
| 7,620,537 B2 * | 11/2009 | Johnson ................... G09B 9/00 703/22 |
| 8,468,244 B2 * | 6/2013 | Redlich ................... G06Q 10/06 705/50 |
| 8,572,390 B2 * | 10/2013 | Leclercq et al. ............. 713/181 |

(Continued)

FOREIGN PATENT DOCUMENTS

| | | |
|---|---|---|
| EP | 0399418 A2 | 11/1990 |
| EP | 0969439 A2 | 1/2000 |

(Continued)

OTHER PUBLICATIONS

Mendro et al., "Integrated Live and Simulation Environment System for an Aircraft," U.S. Appl. No. 12/628,831, filed Dec. 1, 2009, 62 pages.

(Continued)

*Primary Examiner* — Robert J Utama
*Assistant Examiner* — Elroy S Crocker
(74) *Attorney, Agent, or Firm* — Yee & Associates, P.C.

(57) ABSTRACT

A method and apparatus for managing data in a platform. A first permission level is identified for first data in the data generated by a source in the platform. A second permission level is identified for an intended recipient of the first data. The first data is modified to form second data in the data in which the second data has the second permission level. The second data is distributed to the intended recipient.

20 Claims, 17 Drawing Sheets

(56) References Cited

U.S. PATENT DOCUMENTS

| | | | |
|---|---|---|---|
| 8,616,884 B1* | 12/2013 | Lechner | G09B 9/12 434/35 |
| 2003/0046396 A1 | 3/2003 | Richter et al. | |
| 2007/0264617 A1 | 11/2007 | Richardson et al. | |
| 2009/0089580 A1* | 4/2009 | Sugikawa | 713/168 |
| 2011/0171611 A1 | 7/2011 | Batcheller et al. | |
| 2011/0313658 A1 | 12/2011 | He | |
| 2012/0110077 A1 | 5/2012 | Merchant et al. | |
| 2012/0156653 A1 | 6/2012 | Wokura | |
| 2012/0204059 A1 | 8/2012 | Preston | |

FOREIGN PATENT DOCUMENTS

| | | |
|---|---|---|
| WO | 2012082242 | 6/2012 |
| WO | WO2014093534 A2 | 6/2014 |

OTHER PUBLICATIONS

Lechner et al., "Integrated Live and Simulation Environment System for an Aircraft," U.S. Appl. No. 13/304,514, filed Nov. 25, 2011, 78 pages.

Lechner et al., "Integrated Live Constructive Technologies Applied to Tactical Aviation Training," Proceedings of the Interservice/Industry Training, Simulation, and Education Conference (I/ITSEC), Nov. 2008, 11 pages.

Sowadski et al., "Occlusion Server for an Integrated Live and Simulation Environment for an Aircraft," U.S. Appl. No. 12/880,701, filed Sep. 13, 2012, 79 pages.

International Search Report and Written Opinion, dated May 2, 2016, regarding Application No. PCT/US2013/074470,211 pages.

International Search Report and Written Opinion, dated Jul. 2, 2014, regarding Application No. PCT/US2013/074470, 11 pages.

Bertino et al., "Secure and selective dissemination of XML documents," ACM Transactions on Information and System Security (TISSEC), Aug. 2002, pp. 290-331.

Kaushik et al., "Policy-Based Dissemination of Partial Web-Ontologies," Proceedings of the 2005 ACM Workshop on Secure Web Services (SWS'05), Nov. 2005, pp. 43-52.

Rahaman et al., "Towards Secure Content Based Dissemination of XML Documents," Fifth International Conference on Information Assurance and Security (IAS'09), Aug. 2009, pp. 721-724.

International Preliminary Report on Patentabilty, dated Jun. 25, 2015, regarding Application No. PCT/US2013/074470, 7 pages.

Kundu et al., "Secure Dissemination of XML Content Using Structure-based Routing," 10th IEEE International Enterprise Distributed Object Computing Conference (EDOC '06), Oct. 2006, pp. 153-164.

Canadian Search Report, dated May 2, 2016, regarding Application No. 2886452, 5 pages.

* cited by examiner

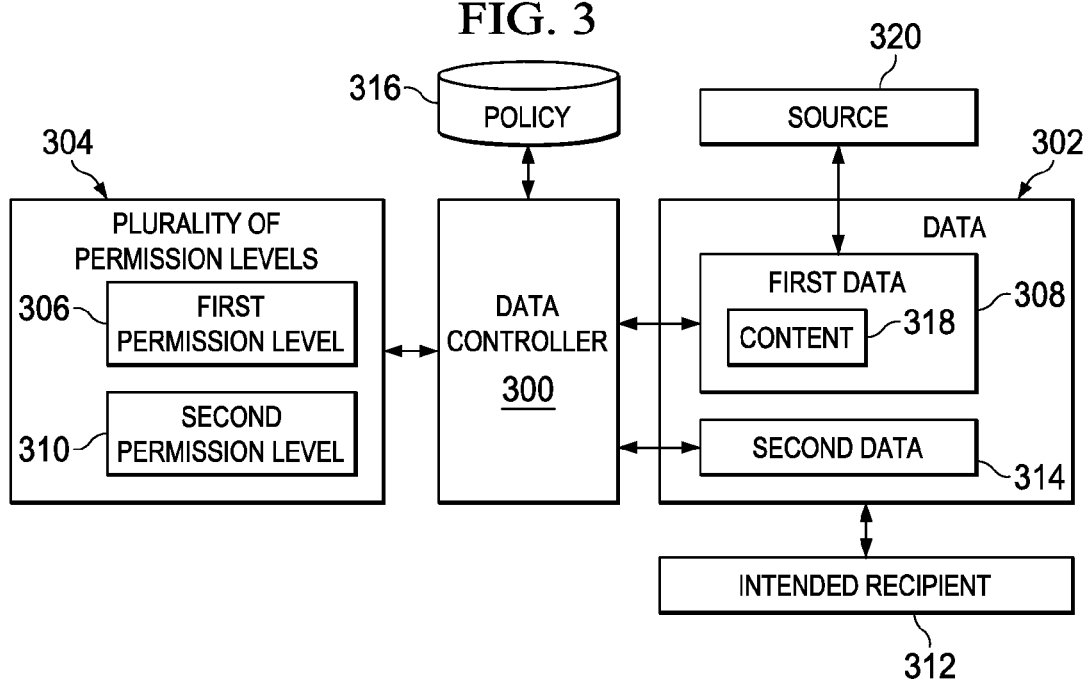
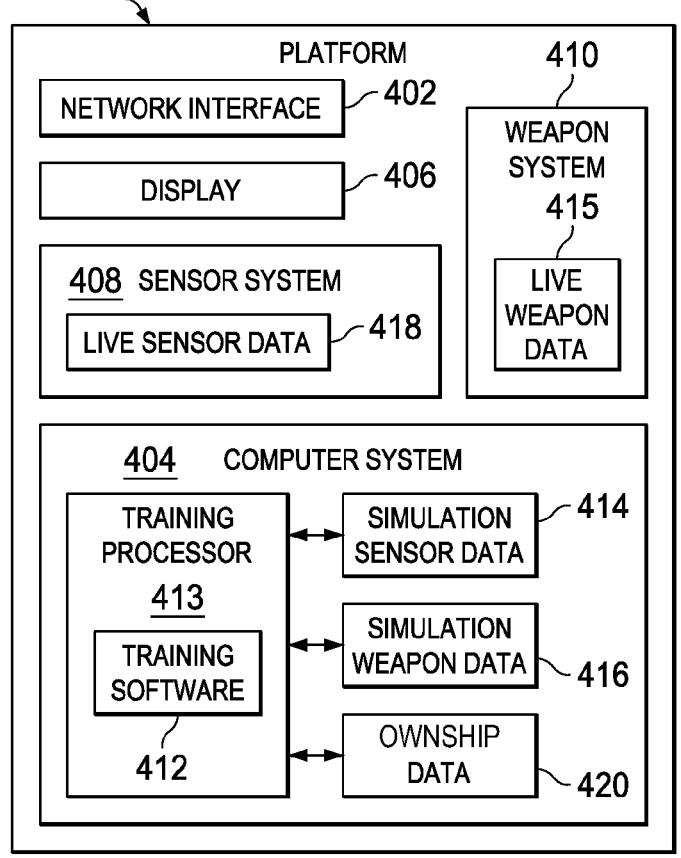

DATA SHARING SYSTEM FOR AIRCRAFT TRAINING

CROSS-REFERENCE TO RELATED APPLICATION

This application is related to the following patent applications: entitled "Integrated Live and Simulation Environment System for an Aircraft", U.S. Ser. No. 12/628,831, filed Dec. 1, 2009; and "Integrated Live and Simulation Environment System for an Aircraft", U.S. Ser. No. 13/304,514, filed Nov. 25, 2011, both assigned to the same assignee and incorporated herein by reference.

BACKGROUND INFORMATION

1. Field

The present disclosure relates generally to vehicles and, in particular, to a method and apparatus for providing training for a vehicle. Still more particularly, the present disclosure relates to a method and apparatus for sharing data generated by the vehicle and other vehicles in a training session.

2. Background

Training exercises are often performed using vehicles. For example, training exercises in the form of military training exercises may be performed using aircraft, ground vehicles, ships, and other suitable platforms. These training exercises may be used to teach operators how to operate the vehicles, coordinate operation of the vehicles with other operators, practice strategies and tactics, and for other suitable training purposes.

For example, the operators of the vehicles may train to improve skills and reactions to adversarial events. These events may include, for example, without limitation, encountering enemy aircraft, encountering enemy ground vehicles, encountering enemy ships, reacting to a presence of surface-to-air missile sites, engaging time sensitive targets, performing reconnaissance of targets and locations, and other suitable events.

A portion of training may be performed using training devices on the ground. These training devices often take the form of simulators. A simulator is a system that copies or simulates the experience of operating a vehicle. A simulator is meant to make the experience as real as possible. Simulators may range from controls and a display in a room to a full-size replica of a portion of the vehicle mounted on actuators that are configured to move the cockpit in response to actions taken by an operator. These types of simulators provide a capability to teach operators of the vehicle to operate various vehicle systems and to react to different events.

Additionally, training is also performed through training exercises using live vehicles. These types of training exercises expose operators to the actual conditions encountered when operating a vehicle such as a fighter aircraft or a tank.

With military aircraft, this type of training is typically performed on various areas or ranges. This type of training may involve using multiple live vehicles to perform training for encountering enemy aircraft. Further, various ground platforms also may be used. These ground platforms may include, for example, without limitation, tanks, surface-to-air missile systems, and other suitable ground units. These types of training exercises provide a pilot with the additional experience needed to operate a vehicle in different conditions.

With the use of equipment such as training devices and live vehicles, data may be exchanged between training devices, live vehicles, or a combination thereof during a training exercise. Data may also be exchanged over wireless communications links. However, the types of equipment used may be restricted because of the security level in data that may be transmitted between the equipment. Thus, differences in security levels between equipment may restrict what equipment may be used in a particular training exercise.

For example, when performing training exercises between two different countries, the security level of the data that may be transmitted may limit what equipment may be used. As a result, the training exercise may not be as robust or may not provide as realistic of a scenario because of the limitations of what equipment may be used in the training exercise.

Therefore, it would be desirable to have a method and apparatus that takes into account at least some of the issues discussed above, as well as other possible issues.

SUMMARY

In one illustrative embodiment, an apparatus comprises a vehicle and a training processor. The training processor is configured to be connected to the vehicle. The training processor is further configured to distribute data generated by the vehicle at a plurality of permission levels, identify a first permission level for first data in the data, identify a second permission level for an intended recipient of the first data, modify the first data to form second data in the data in which the second data has the second permission level, and distribute the second data to the intended recipient.

In another illustrative embodiment, an apparatus comprises an aircraft, a number of systems associated with the aircraft, and a training processor. The training processor is configured to be connected to the aircraft. The training processor is configured to distribute data generated by the aircraft during a training session at a plurality of permission levels, identify a first permission level for first data in the data, identify a second permission level for an intended recipient of the first data, modify the first data to form second data in the data in which the second data has the second permission level, and distribute the second data to the intended recipient.

In yet another illustrative embodiment, a method for managing data in a platform is present. A first permission level is identified for first data in the data generated by a source in the platform. A second permission level is identified for an intended recipient of the first data. The first data is modified to form second data in the data in which the second data has the second permission level. The second data is distributed to the intended recipient.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of data flow for a data controller to manage data in accordance with an illustrative embodiment;

FIG. 4 is an illustration of a block diagram of a platform in accordance with an illustrative embodiment;

DETAILED DESCRIPTION

The illustrative embodiments recognize and take into account one or more different considerations. For example, the illustrative embodiments recognize and take into account that platforms such as aircraft, ground vehicles, ships, and other platforms may be developed and manufactured to distribute data in a manner that meets a permission level that is present for the data.

The illustrative embodiments also recognize and take into account that during a training simulation, a number of platforms with different levels of permission may be operating in the same training environment. These platforms may need to communicate with each other by sharing data. However, it may not be desirable to share some or all of the data with platforms that have a lower level of permission than the transmitting platform. As a result, communications between platforms in a training environment need to be processed to take into account these differences in permission levels for the data.

Thus, the illustrative embodiments provide a method and apparatus for managing data in a vehicle. A first permission level is identified for first data in the data generated by a source in the vehicle. A second permission level is identified for an intended recipient of the first data. The first data is modified to form second data in the data in which the second data has the second permission level. The second data is distributed to the intended recipient.

Figure 1:
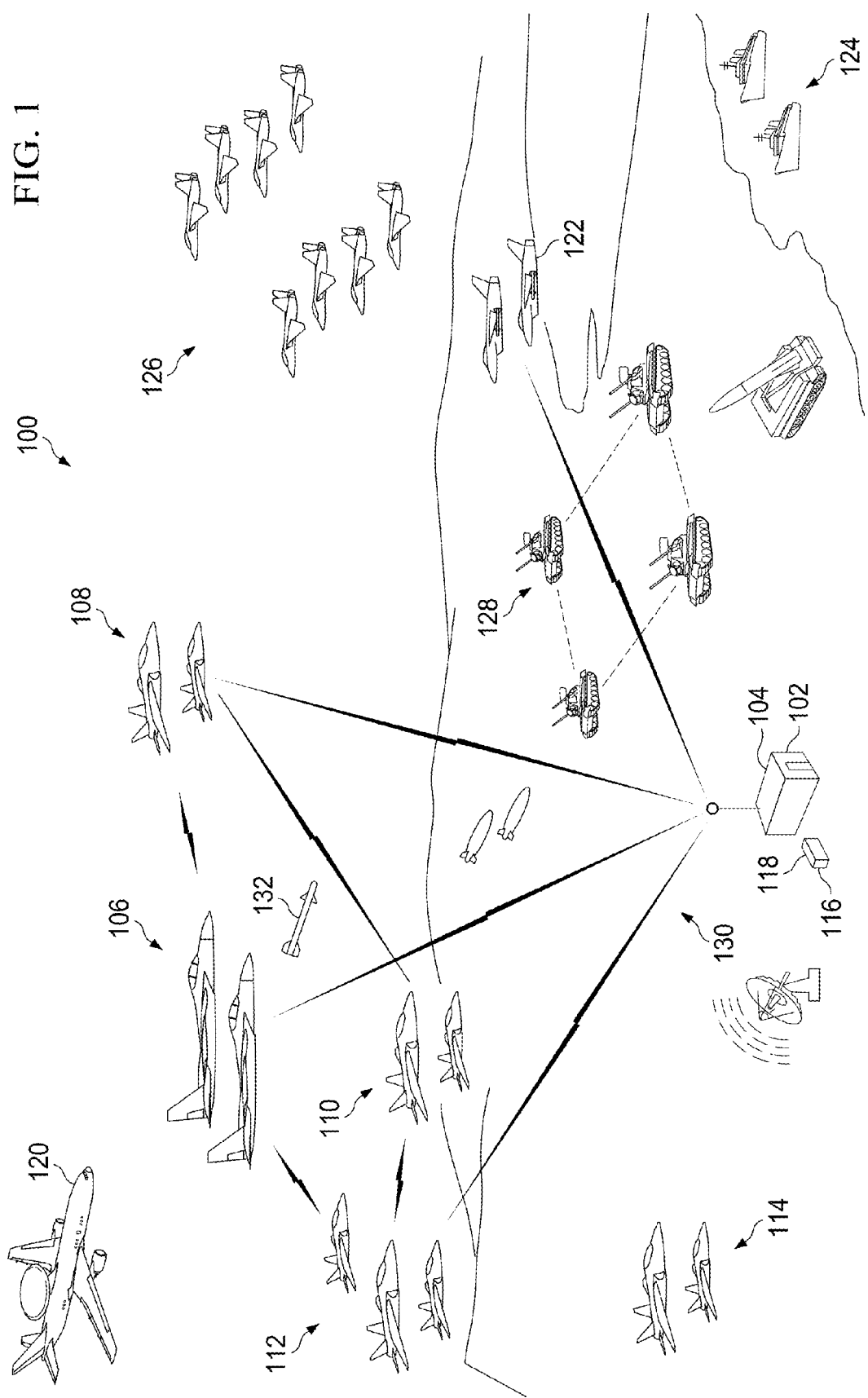
FIG. 1 is an illustration of a training environment in accordance with an illustrative embodiment.

With reference now to the figures, and in particular, with reference to FIG. 1, an illustration of a training environment is depicted in accordance with an illustrative embodiment. In this depicted example, training environment 100 is an example of one environment in which an illustrative embodiment may be implemented to manage the distribution of data within training environment 100.

As depicted, training environment 100 includes training system 102 located in building 104. Training system 102 may be implemented to perform a training session between different platforms in training environment 100. In this illustrative example, the training session is a military training session.

As depicted, the training session may be performed using vehicles that are live objects. A live object, in the different illustrative examples, is a physical object that may be touched or handled. For example, when the live object is a vehicle such as an aircraft, the live object is the actual aircraft and not a computer representation of the aircraft or a training device for the aircraft. These live vehicles may interact with other vehicles that may be live vehicles, virtual vehicles, constructive vehicles, or some combination thereof.

As depicted, the training session may involve a first team and a second team. The first team may include first group of aircraft 106, second group of aircraft 108, third group of aircraft 110, and fourth group of aircraft 112. As used herein, a "group of" when used with reference to items means one or more items. For example, a group of aircraft may be one or more aircraft in the illustrative examples.

In addition, the first team may also include group of virtual aircraft 114. Group of virtual aircraft 114 is a group of virtual objects representing aircraft that may be generated through training devices 116 in building 118 in this illustrative example. In the illustrative examples, a virtual object is not a live object. In the illustrative examples, a virtual aircraft is a simulation of a live aircraft by a training device in training devices 116. A virtual aircraft may be represented in a location in space in training environment 100. In the illustrative examples, the location is a three-dimensional location and may be described using latitude, longitude, and altitude. Additionally, the virtual aircraft also may have an orientation and move.

Additionally, the first team may also include constructive aircraft 120. Constructive aircraft 120 is a constructive object generated by training system 102 in this illustrative example.

In the illustrative examples, a constructive object is not a live object. A constructive object is a simulation of a live object and may have a location in space in training environment 100. Additionally, the constructive object may have an orientation and also may move in a similar fashion to a virtual object that may be represented in space in training environment 100.

In this illustrative example, the second team includes fifth group of aircraft 122. Fifth group of aircraft 122 is also a physical group of aircraft in the illustrative example. Additionally, the second team includes group of ships 124. The second team also includes group of constructive aircraft 126 and group of constructive ground vehicles 128.

In this illustrative example, group of virtual aircraft 114, constructive aircraft 120, group of constructive aircraft 126, and group of constructive ground vehicles 128 are not physical objects in these illustrative examples. These constructive objects are generated by training system 102 as simulations of live aircraft and live vehicles.

However, the other physical vehicles, including first group of aircraft 106, second group of aircraft 108, third group of aircraft 110, fourth group of aircraft 112, fifth group of aircraft 122, and ships 124, may interact with these virtual and constructive objects.

In this illustrative example, the representations of virtual objects and constructive objects may be made available to live objects through the exchange of data with the live objects and training system 102. The live objects, constructive objects, and virtual objects may interact with each other in the illustrative examples. The interaction may occur through the exchange of data using communications links 130 established with each other, training system 102, and training devices 116.

In addition, live objects may interact with other live objects using virtual objects in the different illustrative examples. For example, first group of aircraft 106 may generate and fire virtual missile 132 towards fifth group of aircraft 122. Whether virtual missile 132 hits and causes damage to any of fifth group of aircraft 122 may be managed through training system 102, first group of aircraft 106, or some combination thereof.

The data in training environment 100 may have different permission levels. Additionally, the different aircraft, ground vehicles, and ships in training environment 100 also may have different permission levels. In performing a training session, a vehicle should only receive data for which the vehicle has permission based on a permission level assigned to the vehicle.

In this illustrative example, the distribution of data through communications links 130 may be managed to enforce different permission levels that may be present for different devices that may be implemented in the vehicles, training system 102, and training devices 116.

In this manner, training environment 100 may be implemented to allow vehicles having different permission levels to participate in a training session in training environment 100. For example, first group of aircraft 106 on the first team may have a different permission level as compared to third group of aircraft 110 on the first team. Although the groups of aircraft may be on the same team, the groups of aircraft may originate from different countries.

With the implementation of a data control system in training environment 100 to manage different permission levels for different devices, a more robust training session may be performed in training environment 100. The quality of the training session may be increased through the availability of different types of platforms that may be used when the data transferred between the different platforms are managed through a data control system in accordance with an illustrative embodiment. In this illustrative example, the data control system may be centralized or may be distributed. For example, the data control system may be located in at least one of the vehicles, training devices 116, and training system 102 in training environment 100.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

Further, the data control system implemented in training environment 100 may be dynamic such that the assignment of permission levels may change during a training session. In other words, permission levels for existing platforms in the training session may be changed. Additionally, permission levels may be assigned to new platforms that are added to the training session. For example, the dynamic management of permissions may also allow for the addition of other vehicles in training environment 100 during a training session.

Although the illustrative example in this figure has been described with respect to a training environment in the form of a military training session, the illustrative examples may be implemented using other types of training sessions in training environment 100. For example, the training session may be a commercial training session such as one involving aircraft in an air traffic control system. In yet other examples, the training session may be one for training on fighting a forest fire.

Figure 2:
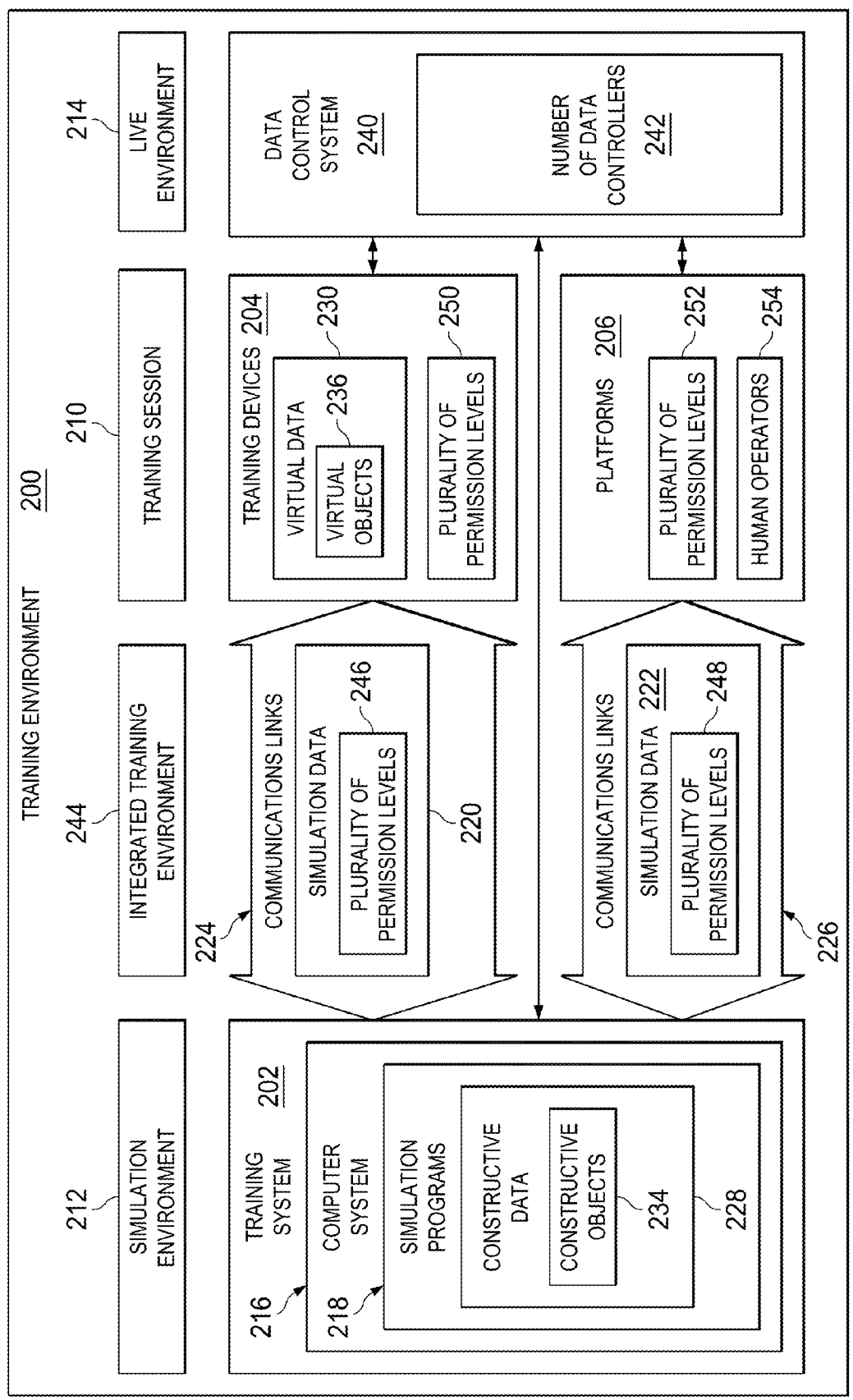
FIG. 2 is an illustration of a block diagram of a training environment in accordance with an illustrative embodiment.

Turning now to FIG. 2, an illustration of a block diagram of a training environment is depicted in accordance with an illustrative embodiment. In this depicted example, training environment 100 in FIG. 1 is an example of one implementation for training environment 200 shown in block form in FIG. 2.

As depicted in this example, training environment 200 takes the form of integrated training environment 244. In other words, the interaction between virtual objects 236, constructive objects 234, and platforms 206 may be integrated during training session 210.

In the illustrative example, training session 210 may be run by training system 202. Training system 202 is configured to generate and manage training session 210. In this illustrative example, training system 202 may manage training session 210 using both simulation environment 212 and live environment 214.

For example, training session 210 may generate constructive objects 234 to simulate various types of platforms for simulation environment 212. Additionally, training system 202 may manage virtual objects 236 generated by training devices 204 in simulation environment 212. For example, training system 202 may manage the interaction between virtual objects 236 generated by training devices 204, constructive objects 234 generated by simulation programs 218 in training system 202, and platforms 206.

In the illustrative example, platforms 206 are live objects in live environment 214. For example, platforms 206 may be aircraft, ground vehicles, and ships as illustrated in FIG. 1.

In the illustrative examples, constructive objects 234 and virtual objects 236 are objects that simulate live objects. Constructive objects 234 and virtual objects 236 are examples of simulation objects in simulation environment 212 for training session 210.

In this illustrative example, simulation programs 218 may run on computer system 216 in training system 202. Computer system 216 is comprised of one or more computers. When more than one computer is present, those computers may be in communication with each other over a communications medium such as a network.

As depicted, simulation programs 218 generate constructive data 228, including constructive objects 234. A constructive object is a simulation of a live object. The constructive object is an example of a simulation object.

Constructive objects 234 may include at least one of an aircraft, a ground vehicle, a ship, a missile site, a missile, and other suitable types of objects. In other words, constructive objects 234 may represent at least one of platforms and other objects that may interact with platforms in the illustrative example.

In addition to defining constructive objects 234, constructive data 228 may include other information. This information may be, for example, the location, orientation, direction of movement, and other information about constructive objects 234.

As depicted, training devices 204 generate virtual data 230, including virtual objects 236. A virtual object is a simulation of a live object.

Additionally, virtual data 230 also may include other information about the objects being simulated. For example, this other information may include the location and direction of movement of virtual objects 236 as well as other information about virtual objects 236.

At least one of constructive objects 234 and virtual objects 236 may interact with platforms 206. Constructive objects 234 and virtual objects 236 may include at least one of an aircraft, a ground vehicle, a ship, a missile, or some other suitable object that may be simulated through simulation programs 218 and training devices 204.

In the illustrative example, training devices 204 include one or more devices that may be operated by a human operator. In this illustrative example, training devices 204 may take the form of simulators of vehicles and other platforms. For example, training devices 204 may include a flight simulator for an aircraft, a ground vehicle simulator for a ground vehicle, and other suitable types of training devices.

In performing training session 210, training system 202 may facilitate the exchange of simulation data 220 and simulation data 222. For example, simulation data 220 may be exchanged between training devices 204 and training system 202 over communications links 224. Simulation data 222 may be exchanged between training system 202 and platforms 206 over communications links 226. Additionally, training system 202 may send simulation data 220 received from training devices 204 to platforms 206. In a similar fashion, simulation data 222 received from platforms 206 may be sent by training system 202 to training devices 204 during training session 210.

In the illustrative example, human operators 254 may perform training session 210 using platforms 206. Training session 210 may also include at least one of constructive objects 234 and virtual objects 236 that may interact with platforms 206 using training system 202.

In this illustrative example, simulation data 220 may include at least one of virtual data 230 and constructive data 228. Simulation data 222 may include at least one of virtual data 230 and constructive data 228. For example, simulation data 220 and simulation data 222 may include, for example, simulation objects such as constructive objects 234 and virtual objects 236, data identifying a location of a simulation object, a heading of a simulation object, an identification of a simulation object, and other suitable data.

In this illustrative example, constructive objects 234 and virtual objects 236 may be presented to human operators 254 in platforms 206. This presentation may be such that constructive objects 234 and virtual objects 236 appear to be live objects within training environment 200.

The interaction of platforms 206 with constructive objects 234 and virtual objects 236 may occur through the exchange of simulation data 222 with training system 202. In this illustrative example, simulation data 222 received by platforms 206 includes data used to display at least one of constructive objects 234 and virtual objects 236 to human operators 254. Thus, a human operator in human operators 254 operating a platform in platforms 206 may see and interact with constructive objects 234, virtual objects 236, and other platforms in platforms 206.

In this illustrative example, simulation data 220 has plurality of permission levels 246 and simulation data 222 has plurality of permission levels 248. In other words, different portions of simulation data 220 and simulation data 222 may have different permission levels. These permission levels may define which devices in training devices 204 and platforms in platforms 206 may use simulation data 220 and simulation data 222. In this illustrative example, training devices 204 have plurality of permission levels 250. In a similar fashion, platforms 206 have plurality of permission levels 252.

In the illustrative example, data control system 240 controls the distribution of data such as simulation data 220 and simulation data 222. This control is based on plurality of permission levels 246 for simulation data 220 and plurality of permission levels 248 for simulation data 222 as compared to plurality of permission levels 250 for training devices 204 and plurality of permission levels 252 for platforms 206.

Further, different portions of simulation data 220 may have different permission levels within plurality of permission levels 246. In a similar fashion, different portions of simulation data 222 also may have different permission levels within plurality of permission levels 248.

In the illustrative example, data control system 240 is configured to control the distribution of simulation data 220 and simulation data 222 based on plurality of permission levels 246 for simulation data 220 and plurality of permission levels 248 for simulation data 222. In this manner, the distribution of simulation data 220 and simulation data 222 may be such that only training devices within training devices 204 with the appropriate permission levels in plurality of permission levels 250 receive appropriate portions of simulation data 220 and only platforms 206 with appropriate permission levels in plurality of permission levels 252 receive portions of simulation data 222. This management of data may also apply to components within platforms 206, training devices 204, and training system 202.

In this illustrative example, data control system 240 may be implemented using hardware, software, firmware, or a combination of the three. When software is used, the operations performed by data control system 240 may be implemented in program code configured to run on a processor unit. When hardware is employed, the hardware may include circuits that operate to perform the operations in data control system 240. When firmware is used, the operations performed by data control system 240 may be implemented in program code and data and stored in persistent memory to run on a processor unit.

In the illustrative different examples, the hardware may take the form of a circuit system, an integrated circuit, an application specific integrated circuit (ASIC), a programmable logic device, or some other suitable type of hardware configured to perform a number of operations.

With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In different illustrative examples, data control system 240 may be distributed in the different components in training environment 200. For example, number of data controllers 242 may be located in at least one of training system 202, training devices 204, and platforms 206.

The illustration of training environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a constructive object and a virtual object may represent objects other than live objects. In the illustrative example, a constructive object and a virtual object may represent an object that may have a design but has not yet been produced. In another illustrative example, training system 202 may be located in various locations. For example, training system 202 may be located in a building on the ground, in an aircraft, on a ship, or in some other suitable location.

In this illustrative example, platforms 206 may take various forms in addition to or other than the aircraft, ships, and ground vehicles shown in FIG. 1. For example, platforms 206 may take the form of a mobile platform, a stationary platform, a land-based structure, an aquatic-based structure, a space-based structure, and other suitable types of structures. For example, a platform in platforms 206 may be a vehicle, a surface ship, a tank, a personnel carrier, a train, a spacecraft, a commercial aircraft, a military aircraft, a space station, a satellite, a submarine, an unmanned ground vehicle, an unmanned aerial vehicle, a ground-based robot, an automobile, a ground vehicle, and other suitable types of mobile platforms. Platforms 206 may also be stationary structures such as an air traffic control station, a missile battery, an anti-aircraft battery, and other suitable types of platforms.

As another example, a platform in platforms 206 may participate in training session 210 in a number of different ways. For example, when the platform is an aircraft, the aircraft may participate in training session 210 while the aircraft is in the air during flight or on ground.

In some illustrative examples, a single simulation program may be used in training system 202 rather than simulation programs 218. In yet other examples, training devices 204 may be omitted from training environment 200 or may not be used during training session 210.

Additionally, in some illustrative examples, multiple permission levels within plurality of permission levels 250 may be traversed using data control system 240. In other words, multiple permission levels within plurality permission levels 250 may be traversed using processes of the illustrative embodiments that may be implemented in one or more of number of data controllers 242 within data control system 240. The processes for managing data exchanged between different components in training environment 200 may be performed for each permission level within plurality permission levels 250.

Turning now to FIG. 3, an illustration of data flow for a data controller to manage data is depicted in accordance with an illustrative embodiment. In this illustrative example, data controller 300 is an example of a data controller in number of data controllers 242 in FIG. 2.

In this illustrative example, data controller 300 is configured to be connected to or otherwise associated with a platform. When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Data controller 300 is configured to distribute data 302 generated by a component such as a platform in platforms 206, a simulation program in simulation programs 218, a training device in training devices 204, or some other suitable component.

In this illustrative example, data controller 300 is configured to control the distribution of data 302 based on plurality of permission levels 304. Plurality of permission levels 304 may take various forms. For example, plurality of permission levels 304 may be implemented using security classification levels such as top secret, secret, confidential, restricted, and unclassified.

Of course, plurality of permission levels 304 may be implemented using other types of access or security levels. For example, plurality of permission levels 304 may be defined similar to levels of permission associated with access control for access to resources in systems such as those used in computer systems, telecommunication systems, and other similar systems.

In other illustrative examples, plurality of permission levels 304 may be defined based on assigning numbers to different security levels. For example, plurality of permission levels 304 may have eight levels numbered from one to eight. With this example, level one may be the highest or most restricted level while level eight is the lowest or least restricted level.

As depicted, data controller 300 is configured to identify first permission level 306 in plurality of permission levels 304 for first data 308. Additionally, data controller 300 is also configured to identify second permission level 310 in plurality of permission levels 304 for intended recipient 312 of first data 308.

In this illustrative example, intended recipient 312 may take a number of different forms. The forms may depend on the granularity at which control to the access of data 302 is desired.

As depicted, intended recipient 312 may be any component within training environment 200 that may be intended to receive first data 308. For example, intended recipient 312 may be a platform in platforms 206, a training device in training devices 204, hardware within computer system 216, a simulation program in simulation programs 218, a training processor in a vehicle, a computer in a vehicle, a processor unit or other piece of hardware within a vehicle or other platform, a model in a training processor, another aircraft, a ground vehicle, a ship, a spacecraft, a group of vehicles, a group of platforms, a model in the training processor, a storage device in the training processor, a processor unit in the training processor, another training processor in a pod, and a server computer in a ground location, or other suitable intended recipients.

In this illustrative example, first data 308 is modified by data controller 300 to form second data 314 such that second data 314 has second permission level 310 for intended recipient 312. Then, data controller 300 distributes second data 314 to intended recipient 312.

As depicted, first permission level 306 may be greater than second permission level 310. In this case, the modification of first data 308 to form second data 314 may include at least one of removing a portion of first data 308, and changing a portion of first data 308. The portion may be some or all of first data 308 depending on the particular implementation. Also, one portion of first data 308 may be modified while another portion of first data 308 may be deleted in the illustrative example.

For example, a portion of first data 308 removed may be at least one of the location of a platform, the speed of a platform, the identification of a type of sensor in the platform, the identification of a type of weapon in the platform, and other data about the platform.

When the portion of first data 308 is changed, the portion of data changed may be, for example, at least one of increasing the error in values for parameters, decreasing the specificity of the component generating first data 308, and other suitable changes.

For example, the location of the platform may be changed to increase the error in the location. In one illustrative example, the error may be changed from about two feet to about thirty feet.

Further, in some illustrative examples, first permission level 306 for first data 308 may be the same as second permission level 310 for intended recipient 312. In this instance, the modification of first data 308 to form second data 314 results in no modification. In other words, a removal or change of first data 308 does not occur and first data 308 is the same as second data 314.

In this illustrative example, the modification of first data 308 to form second data 314 may be identified using policy 316. Policy 316 is a group of rules used to apply a number of modifications to first data 308 and may also include data used to apply the group of rules to modify first data 308.

Additionally, policy 316 also may be used to identify first permission level 306 for first data 308, second permission level 310 for intended recipient 312, or both. In other words, policy 316 may be used to identify permission levels as well as modifications that may be needed to first data 308.

In the illustrative example, policy 316 may be configured to be dynamic. In other words, policy 316 may be changed during a training session. For example, policy 316 may be changed during a training session if new platforms are added, removed, or existing platforms are removed. This modification may apply to live platforms as well as simulation platforms.

The change in the platforms in the training session may result in changes in permission levels in the exchange of data between the platforms. These changes to policy 316 may be implemented during the training session without halting or restarting the training session.

In this illustrative example, the identification of first permission level 306 for first data 308 using policy 316 may be based on content 318 of first data 308. Content 318 may include data used to identify source 320 of first data 308.

In the different illustrative examples, source 320 may take various forms. For example, source 320 may be a component such as a piece of hardware, a processor unit, a model, a sensor system, a weapon system, or other suitable components. Source 320 also may be the hardware, software, or a combination of the two used to generate simulation objects such as constructive objects and virtual objects for different types of platforms.

In the illustrative example, source 320 may be identified in content 318 based on one or more parameters in content 318 that define the component. For example, a parameter may be a parameter that defines a component in the form of a sensor. The parameter also may be, for example, a type of sensor, a manufacture of a sensor, or some other suitable parameter about the sensor.

In this illustrative example, content 318 may take various forms. For example, content 318 used to identify source 320 of first data 308 may be at least one of a group of keys, codes, identifiers, or other suitable types of data that may be used to identify source 320.

With reference now to FIG. 4, an illustration of a block diagram of a platform is depicted in accordance with an illustrative embodiment. As depicted, platform 400 is an example of one implementation for a platform in platforms 206.

As depicted, platform 400 includes a number of components, such as network interface 402, computer system 404, display 406, sensor system 408, and weapon system 410. In this illustrative example, platform 400 may take the form of a military platform. Of course, platform 400 may be implemented as a non-military platform, a commercial platform, a civilian platform, or some other suitable type of platform.

In this illustrative example, network interface 402 is configured to provide communications to exchange data. For example, network interface 402 may be a wireless communications unit configured to establish communications links with training system 202 and other platforms in platforms 206.

Computer system 404 is comprised of one or more computers. Training software 412 runs on training processor 413 in computer system 404. In this illustrative example, training software 412 is configured for processing simulation data 222 received from training system 202 for performing an exercise in training session 210.

Additionally, training software 412 also may process data generated by different components in platform 400. For example, training software 412 may generate and process at least one of simulation sensor data 414 and simulation weapon data 416. Simulation sensor data 414 and simulation weapon data 416 may be sent as part of simulation data 222 sent to training system 202 in FIG. 2.

In addition, training processor 413 also may generate ownship data 420. Ownship data 420 is data that describes platform 400. For example, ownship data 420 may include a location, orientation, and direction of travel for platform 400. Further, ownship data 420 also may include an identifier for platform 400. This identifier may be a unique identifier and may include data such as a name, a type of platform, and other suitable data. Additionally, ownship data 420 also may include performance data as well as other data about platform 400. Ownship data 420 may be sent as part of simulation data 222 to training system 202 for use in representing platform 400 within simulation environment 212.

In this illustrative example, sensor system 408 generates live data in the form of live sensor data 418. Live sensor data 418 is generated when sensor system 408 detects one or more live objects in training environment 200.

Further, training software 412 may be configured to display at least one of live sensor data 418, simulation sensor data 414, live weapon data 415, and simulation weapon data 416 on display 406. In other words, simulation data may be presented in combination with live data in the different illustrative examples.

As a result, simulation sensor data 414 and live sensor data 418 may be processed to generate data about objects that are live and simulated. In this manner, a human operator of platform 400 may be able to see both live objects and simulation objects during training session 210 in training environment 200 in FIG. 2. In these illustrative examples, the presentation of simulation objects may be such that a human operator of platform 400 is unable to distinguish between live objects and simulation objects during the training session.

Thus, this integration of simulation sensor data 414 and live sensor data 418 may be used to provide an integration of objects, such as live objects and simulation objects as part of an integrated training environment. As described above, the simulation objects may include at least one of virtual objects and constructive objects.

Of course, the illustration of components for platform 400 is not meant to limit the manner in which platform 400 may be implemented. For example, platform 400 may include other components in addition to or in place of the ones illustrated in FIG. 4. For example, platform 400 may omit weapon system 410 when platform 400 is a non-military platform.

As another example, platform 400 may have a number of systems other than sensor system 408 and weapon system 410. For example, a navigation system may be associated with platform 400 in addition to or in place of other components, depending on the particular implementation for platform 400. The navigation system may be used when platform 400 is a commercial aircraft and the training session involves training with an air traffic control system.

Figure 5:
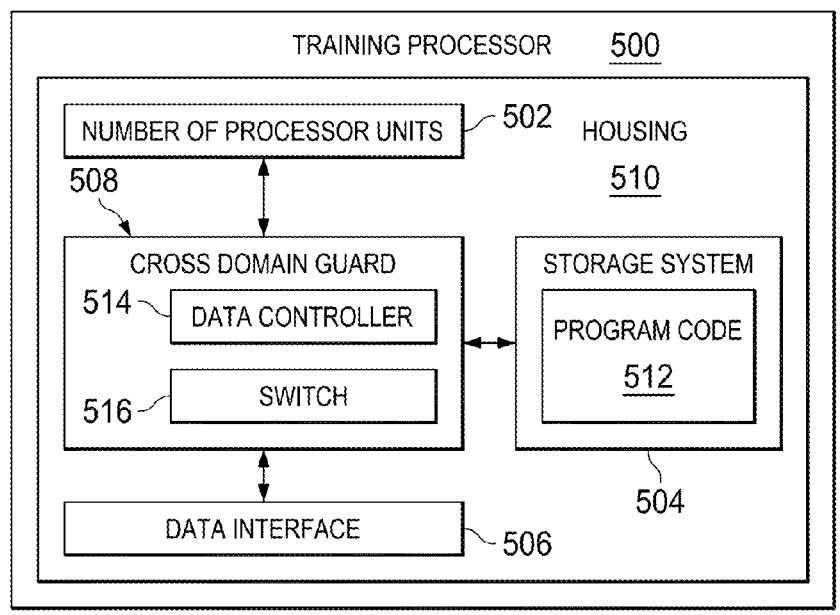
FIG. 5 is an illustration of a block diagram of a training processor in accordance with an illustrative embodiment.

With reference now to FIG. 5, an illustration of a block diagram of a training processor is depicted in accordance with an illustrative embodiment. As depicted, an illustration of components that may be used to implement training processor 413 in FIG. 4 are shown.

As depicted, training processor 413 includes a number of different components. These components include housing 510, number of processor units 502, storage system 504, data interface 506, and cross domain guard 508. These different components are associated with housing 510 in this illustrative example.

Housing 510 is a physical structure configured to hold or support the different components for training processor 413. As depicted, housing 510 is configured to be moveable between platforms. Housing 510 may have a shape and size configured for placement into a pod or other structure that may be associated with platform 400. In other illustrative examples, housing 510 may be omitted and the different components may be integrated as part of platform 400 in FIG. 4.

Number of processor units 502 is hardware. Each processor unit in number of processor units 502 may include one or more processors. These processors are configured to run program code 512 stored in storage system 504. Program code 512 is program code for training software 412 in FIG. 4.

Storage system 504 is a hardware component and comprises one or more storage devices. Storage system 504 may include, for example, at least one of a hard disk drive, a random access memory, a read only memory, a solid state drive, and other suitable types of storage devices.

Data interface 506 is an interface for training processor 500 to other components within platform 400 in FIG. 4. Further, data interface 506 also may provide an interface to exchange data with other platforms or devices located remotely to platform 400. For example, data interface 506 may include a network interface card configured to be connected to computer system 404 in FIG. 4. Further, data interface 506 also may include a wireless communications unit configured to establish a communications link with training system 202 in FIG. 2. Data interface also may include other types of interfaces such as a serial port, a universal serial bus, and other suitable types of communications devices.

Cross domain guard 508 is a hardware component and may include software. Cross domain guard 508 is configured to provide access to data between different domains that may have different permission levels. For example, cross domain guard 508 may provide access between different platforms, components within platform 400 or within training processor 500, or some combination thereof for different security levels that may be assigned to the different platforms, components, or a combination thereof.

In this illustrative example, data controller 514 may be implemented in cross domain guard 508. Data controller 514 is an example of a data controller in number of data controllers 242 in FIG. 2. When data controller 514 is implemented within cross domain guard 508, data controller 514 may be used to control the distribution of data that may be generated by platform 400, received by platform 400 in FIG. 4, or some combination thereof.

Additionally, cross domain guard 508 also may include switch 516. Switch 516 may be used to send data to an intended recipient for the data. In these illustrative examples, switch 516 may take various forms. For example, switch 516 may be a physical switch that directs that data to different processors in number of processor units 502. Switch 516 also may send data to data interface 506.

The illustration of training processor 500 is not meant to imply limitations to the manner in which training processor 500 may be implemented. For example, other training processors may include other components in addition to or in place of the ones illustrated for training processor 500. For example, other training processors may include a power supply, a display, or other suitable components. In other illustrative examples, storage system 504 may be connected directly to number of processor units 502. As another example, cross domain guard 508 may use a router in addition to or in place of switch 516.

In yet another illustrative example, data controller 514 also may include switch 516 or other components needed to distribute data. With this type of implementation, cross domain guard 508 may be an example of an implementation of data controller 514 rather than data controller 514 merely being a component within cross domain guard 508.

Figure 6:
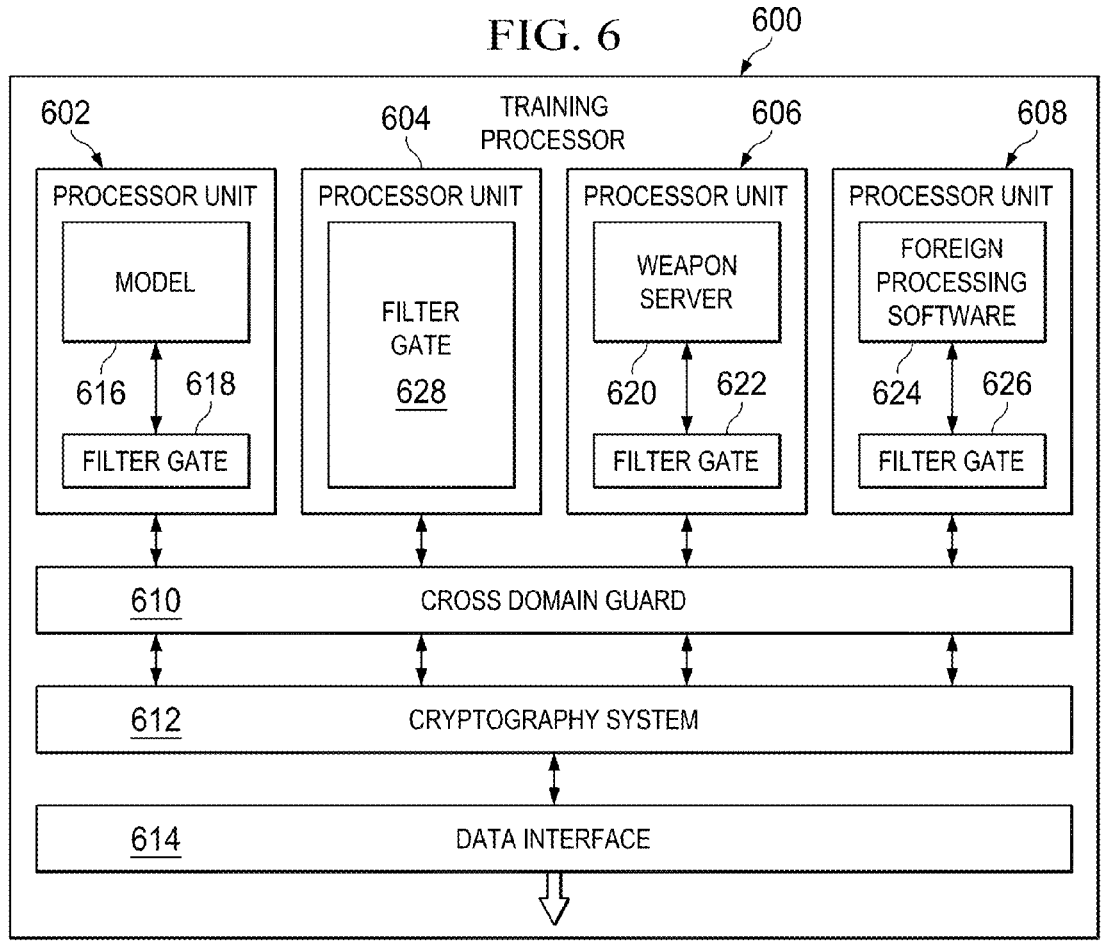
FIG. 6 is an illustration of a block diagram of an implementation for a training processor in a platform in accordance with an illustrative embodiment.

With reference now to FIG. 6, an illustration of a block diagram of an implementation for a training processor in a platform is depicted in accordance with an illustrative embodiment. Training processor 600 is an example of an architecture for training processor 413 in FIG. 4.

In this illustrative example, training processor 600 includes a number of different components. As depicted, training processor 600 includes processor unit 602, processor unit 604, processor unit 606, processor unit 608, cross domain guard 610, cryptography system 612, and data interface 614.

Each processor unit may include one or more processors in these illustrative examples. These processor units may be implemented using processor units for computer systems or may take other forms such as application specific integrated circuits, programmable logic arrays, or other suitable types of hardware that may be used for processing data.

In the different illustrative examples, each processor unit may perform different functions or the same functions as other processor units. As depicted, processor unit 602 runs model 616 with filter gate 618, processor unit 606 runs weapon server 620 with filter gate 622, and processor unit 608 runs foreign processing software 624 with filter gate 626. Processor unit 604 does not run software in this particular example but contains filter gate 628.

Model 616 is a training model in this illustrative example. For example, model 616 may be a weapon system model, a missile system model, a cannon model, radar model, a radar warning receiver model, or some other suitable type of model. Model 616 may generate and receive data about different platforms in the training environment from training processor 600.

Filter gate 618 on processor unit 602 is configured to format data. For example, filter gate 618 may compress data from model 616 for transmission over data interface 614. Additionally, filter gate 618 may process compressed data received by processor unit 602 and place the compressed data into a format for use by model 616.

Weapon server 620 is configured to simulate the firing of weapons by a platform. In these examples, the firing of a weapon may be accomplished using model 616. Weapon server 620 may process any indications of a weapon fired by a platform to determine the direction and location of impact for the weapon. Filter gate 622 is configured to format data for weapon server 620. For example, filter gate 622 may compress data from weapon server 620 for transmission over data interface 614. Moreover, filter gate 622 may process compressed data received by processor unit 606 and place the compressed data into a format for use by weapon server 620.

In particular, weapon server 620 may simulate the weapon in flight and weapon detonation. Weapon server 620 may generate data about weapon type, location, velocity, acceleration, and other suitable data. Further, weapon server 620 also may determine the effect of the weapon on the object. For example, weapon server 620 may determine whether an object has been damaged or destroyed.

Foreign processing software 624 is configured to simulate operations of foreign entities. For example, foreign processing software 624 may process data regarding non-United States entities or players involved in a live training exercise. Filter gate 626 is configured to format data for foreign processing software 624. For example, filter gate 626 may compress data from foreign processing software 624 for transmission over data interface 614. Additionally, filter gate 626 may process compressed data received by processor unit 608 and place the compressed data into a format for use by foreign processing software 624.

Filter gate 628 is also configured to format data. Filter gate 628 may compress or decompress data for software applications running on processor unit 604 in some illustrative examples.

Cross domain guard 610 is configured to manage the distribution of data between processor unit 602, processor unit 604, processor unit 606, and processor unit 608. Additionally, cross domain guard 610 is also configured to manage the distribution of data between processor unit 602, processor unit 604, processor unit 606, processor unit 608, and other components that may be external to training processor 600. For example, the other components may be located in another platform or the same platform depending on the particular implementation. In particular, cross domain guard 610 may include a data controller such as data controller 300 in FIG. 3.

For example, processor unit 602, processor unit 604, processor unit 606, and processor unit 608 may each have a different permission level as compared to one or more of the other processor units. As a result, cross domain guard 610 is configured to control the distribution of data between processor unit 602, processor unit 604, processor unit 606, and processor unit 608. The distribution is controlled to ensure that a processor unit only receives data with a permission level that is appropriate for the permission level of the processor unit. In this illustrative example, the permission level may be security levels, such as top secret, secret, confidential, and unclassified.

In the depicted example, data generated by model 616 running on processor unit 602 may be modified depending on the intended recipient for the data. If the intended recipient has a different permission level from model 616, the data generated by model 616 may be modified.

In one illustrative example, the data generated by model 616 may be sent to weapon server 620 on processor unit 606 as the intended recipient. If the permission level of weapon server 620, processor unit 606, or both are lower than model 616, cross domain guard 610 modifies the data before sending the data to weapon server 620. In other words, the data may be downgraded to accommodate the lower level of security of weapon server 620, processor unit 606, or both. Further, depending on the identification of an intended recipient that is remote to training processor 600, cross domain guard 610 may modify data generated by model 616 to meet the permission level for the intended recipient that is remote to training processor 600.

Cryptography system 612 is configured to encrypt and decrypt data. For example, when data is to be sent from training processor 600 to another component, cryptography system 612 may encrypt the data. The data may be encrypted with different keys depending on the permission level of the data in this illustrative example.

Further, cryptography system 612 also performs decryption of data received from another component outside of training processor 600. Cryptography system 612 may attempt to decrypt the data using the different encryption keys held by cryptography system 612. In this illustrative example, the encryption keys may be public keys and private keys depending on the particular implementation.

In these depicted examples, only training processors having a particular permission level will have the encryption key necessary to decrypt the data when received. As a result, a training processor receiving the data is unable to use the data if the training processor does not have the necessary encryption key. Thus, in an incoming message, some data may not be decrypted while other portions of the message will be decrypted and sent to cross domain guard 610 for further processing.

In other words, a platform with a lower level or permission than the transmitting platform may not have all of the keys necessary to decrypt all portions of the message. As a result, cryptography system 612 is able to decrypt data for permission levels assigned to training processor 600.

Data interface 614 is configured to provide for an exchange of data between training processor 600 and other components. In the illustrative example in this figure, data interface 614 may be implemented using a wireless communications unit configured to establish a wireless communications link with a component for the exchange of data.

The illustration of training processor 600 is not meant to limit the manner in which a training processor may be implemented. For example, model 616 running on processor unit 602, weapon server 620 running on processor unit 606, and foreign processing software 624 running on processor unit 608 may be implemented as functions in hardware in the processor units rather than software running on the software units or some combination thereof.

In another illustrative example, training processor 600 may include other numbers of processor units. For example, training processor 600 may include three processor units, ten processor units, or some other number of processor units.

Additionally, in some illustrative examples, a filter gate may not be present in a processor unit. As a result, some or all messages may not be compressed or decompressed, depending on the particular implementation.

Figure 7:
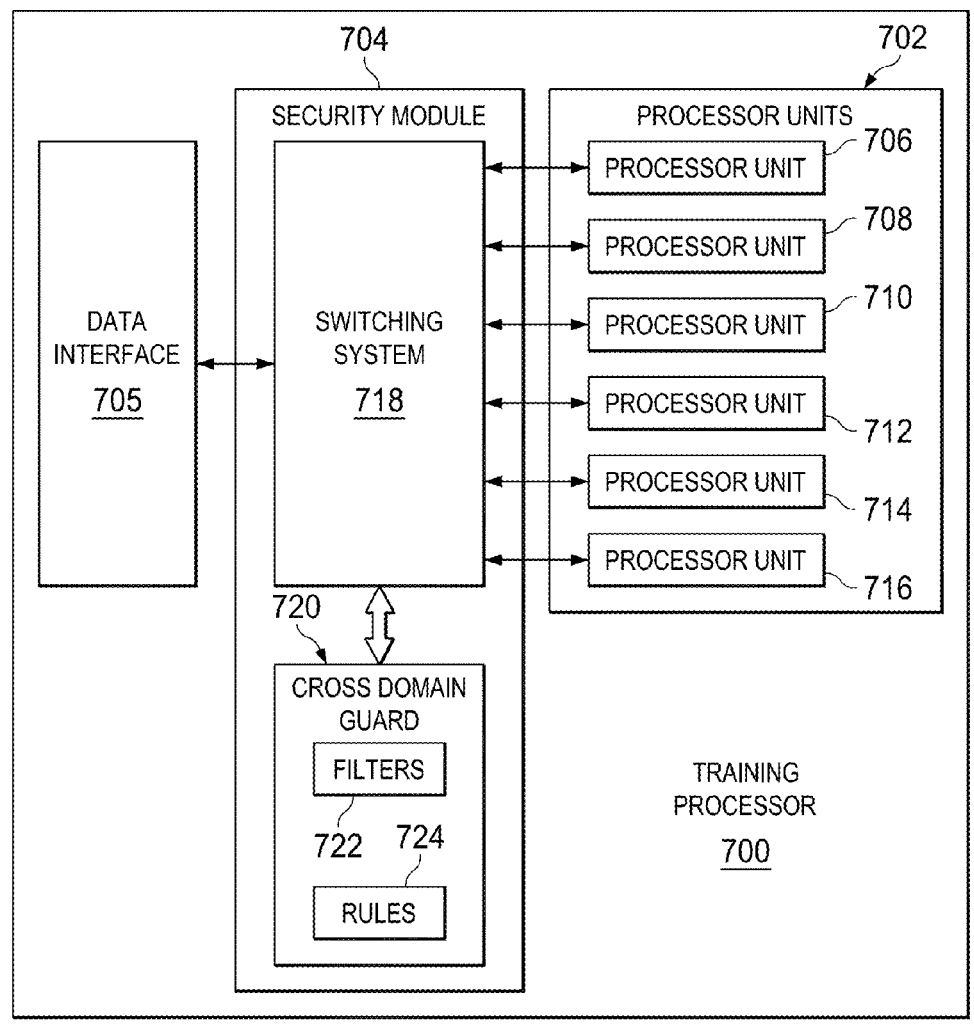
FIG. 7 is an illustration of a block diagram of one implementation for a training processor in accordance with an illustrative embodiment.

With reference now to FIG. 7, an illustration of a block diagram of one implementation for a training processor is depicted in accordance with an illustrative embodiment. In this illustrative example, training processor 700 is an example of one implementation for training processor 413 in FIG. 4.

As depicted, training processor 700 includes a number of components. In this example, training processor 700 includes processor units 702 and security module 704, and data interface 705.

As depicted, processor units 702 includes processor unit 706, processor unit 708, processor unit 710, processor unit 712, processor unit 714, and processor unit 716. Although six processor units are shown, other numbers of processor units may be implemented in other illustrative examples. For example, processor units 702 may be one processor unit, four processor units, sixteen processor units, or some other number of processor units depending on the particular implementation.

Further, processor units 702 may be part of a computer. In other illustrative examples, each processor unit in processor units 702 may be part of different computers.

Security module 704 includes switching system 718 and cross domain guard 720. Switching system 718 is configured to route data between processor units 702 and a data interface that may be connected to training processor 700.

In this illustrative example, a switch is present in switching system 718 for each processor unit in processor units 702. With a separate switch for each processor unit, a physical separation may be established between the processor units. In other illustrative examples, a switch in switching system 718 may be connected to multiple processor units, depending on the particular implementation. In this case, some of the processor units may have the same permission level.

In this illustrative example, cross domain guard 720 includes filters 722 and rules 724. Filters 722 are configured to control the distribution of data between processor units 702 with each other and between processor units 702 and other components that may be remote to training processor 700. In this illustrative example, filters 722 are used to apply rules 724 to data that may flow through security module 704.

Rules 724 identify modifications that may be made to the data. These modifications defined by rules 724 are based on permission levels.

In the illustrative example, rules 724 are implemented in hardware. In other illustrative examples, rules 724 may also be implemented as data located on hardware.

In particular, switching system 718 is connected to cross domain guard 720. In this illustrative example, data flowing from processor units 702 flow through switching system 718 and through cross domain guard 720. After the data has been processed using filters 722, the data may then flow back into switching system 718 and to the intended recipient for the data. As described above, this intended recipient may be a processor unit in processor units 702 or may be another component remote to training processor 700.

Data may flow from filters 722 in cross domain guard 720 to an external destination outside of training processors 700 through data interface 705.

In this illustrative example, data interface 705 may be at least one of a wireless communications unit, a network interface, a bus, and other suitable types of interfaces. Data processed by cross domain guard 720 may be sent back to switching system 718. Switching system 718 may then send the data to an external destination for the data.

Figure 8:
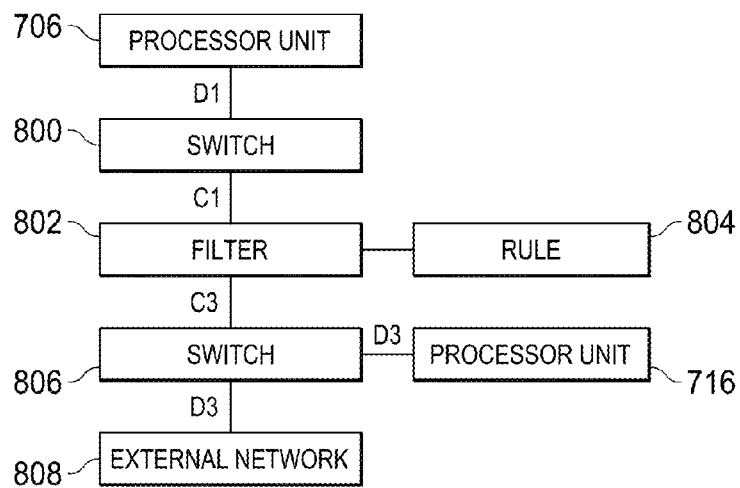
FIG. 8 is an illustration of data flow in a training processor in accordance with an illustrative embodiment.

Turning now to FIG. 8, an illustration of data flow in a training processor is depicted in accordance with an illustrative embodiment. In this illustrative example, processor unit 706 from training processor 700 in FIG. 7 is a source of data. The data generated by processor unit 706 flows to switch 800. Switch 800 is a switch within switching system 718 in FIG. 7. The data is routed by switch 800 to filter 802.

Filter 802 is a filter in filters 722 in cross domain guard 720 in FIG. 7. The filter applies rule 804 to the data. Rule 804 may result in a modification of the data generated by processor unit 706. This data with any modification is then sent to switch 806. Switch 806 is another switch in switching system 718.

Switch 806 then sends the data to processor unit 716, which is the intended recipient in this illustrative example. Additionally, switch 806 may also send the data to external network 808 as another intended recipient of the data.

In this illustrative example, switch 800 provides a path to and from processor unit 706 to filter 802 in filters 722 in FIG. 7. Switch 800 is not connected to other processor units. Additionally, switch 806 provides a path to processor unit 716. Switch 806 is not connected to other processor units. In this manner, a physical separation may be formed between processor units 702 in training processor 700. As a result, security processing of data on processor units 702 may be reduced or unnecessary. In this illustrative example, the management of data is controlled by security module 704 in FIG. 7.

Although this illustrative example only depicts a switch being connected to one other switch, a switch may be able to send data to additional switches. If different permission levels are present, the first switch sends the data to the second switch through a filter in filters 722. As described above, filters 722 are configured to examine the data to determine whether changes to the data should occur such that the data has a permission level appropriate for the second switch. Thus, switches in switching system 718 may have various connections to filters 722 to provide for the distribution of data between different switches.

The illustration of the flow of data from processor unit 706 to processor unit 716, external network 808, or both are provided as one example as to how data may flow within training processor 700 such that the data has a permission level that corresponds to the permission level of the processor unit receiving the data.

This flow of data illustrated in FIG. 8 is only provided as an example of one manner in which data may flow in training processor 700. For example, data may also flow in the reverse direction from processor unit 716 to processor unit 706. In other illustrative examples, data may flow between other processor units within processor units 702 or may flow from other processor units to external network 808.

Figure 9:
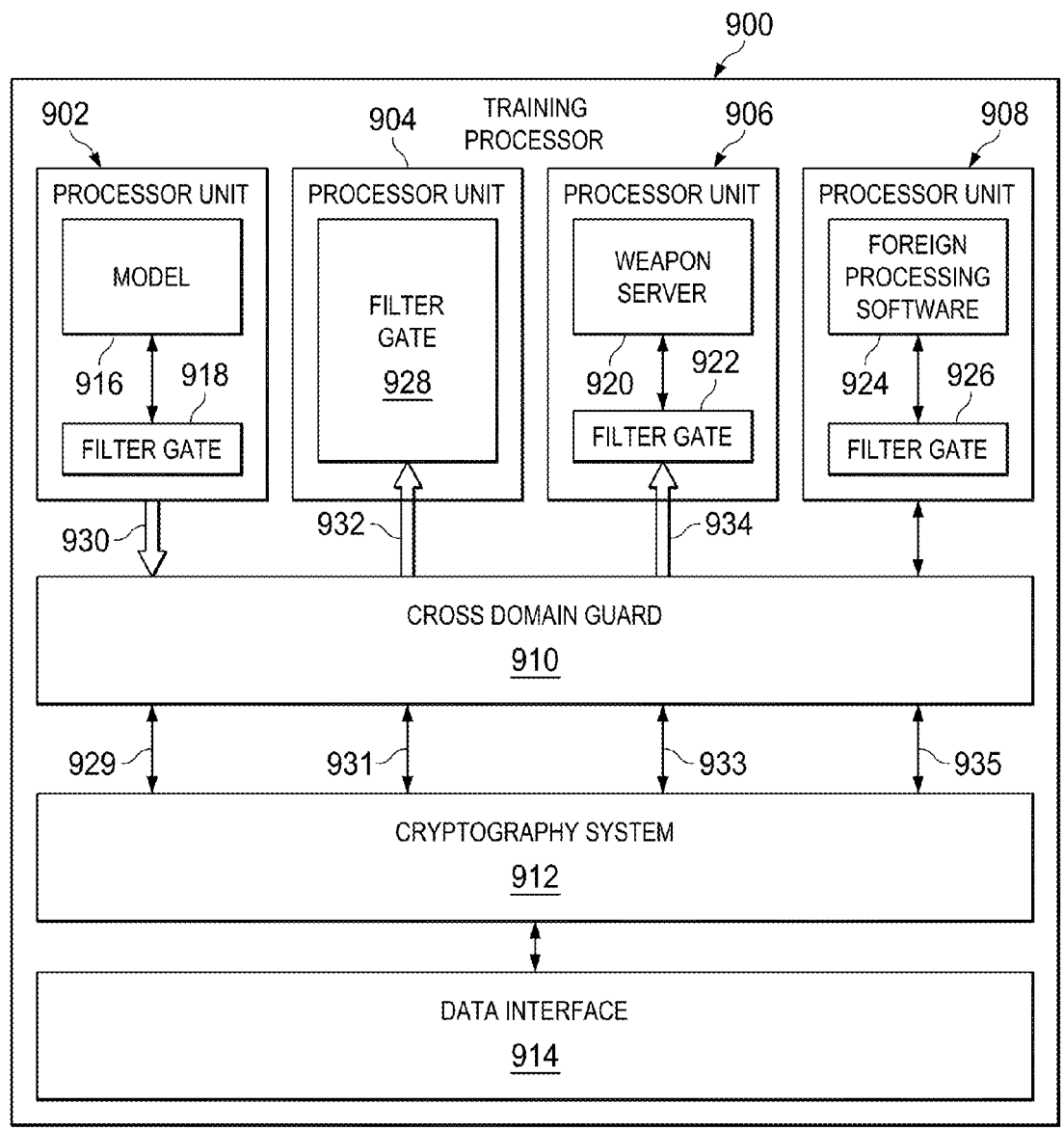
FIG. 9 is another illustration of data flow in a training processor in accordance with an illustrative embodiment.

With reference now to FIG. 9, another illustration of data flow in a training processor is depicted in accordance with an illustrative embodiment. Training processor 900 is an example of an implementation for training processor 600 in FIG. 6.

As depicted, training processor 900 includes processor unit 902, processor unit 904, processor unit 906, processor unit 908, cross domain guard 910, cryptography system 912, and data interface 914. In this illustrative example, each processor unit may perform different functions than the other processor units.

In this depicted example, processor unit 902 runs model 916 with filter gate 918, processor unit 906 runs weapon server 920 with filter gate 922, and processor unit 908 runs foreign processing software 924 with filter gate 926. Processor unit 904 does not run software in this particular example but contains filter gate 928.

In this illustrative example, model 916 generates data 930 and sends data 930 to filter gate 918. Filter gate 918 may compress data 930. In this illustrative example, data 930 is entity state data, emission data, other suitable types of data, or a combination thereof. Further, this illustrative example, entity data may be data about the platform. For example, entity state data may be longitude, latitude, and altitude of the platform performing a missile launch. In this case, data 930 may include data about the location of the platform when the missile was fired.

When data 930 includes emission data, data 930 may include data related to a radar model. As an example, emission data may be radar data from a sensor model on the platform that is to be transmitted to an air traffic control station or other aircraft.

Next, filter gate 918 sends data 930 to cross domain guard 910. Cross domain guard 910 may then apply a set of rules to data 930 or otherwise modify data 930 such that data 930 has a desired permission level corresponding to the permission level of processor unit 904. Similarly, cross domain guard 910 may apply a set of rules to data 930. As used herein, "a set" when used with reference to items means one or more items. For example, a set of rules is one or more rules.

The application of the set of rules is such that data 930 has a desired permission level corresponding to the permission level of weapon server 920. Processor unit 904 and weapon server 920 may have the same or different permission levels in this illustrative example.

As depicted, cross domain guard 910 sends data 932 to processor unit 904. Specifically, cross domain guard 910 may send data 932 to filter gate 928 in processor unit 904. Data 932 is data 930 modified by cross domain guard 910 to have a permission level corresponding to processor unit 904. Filter gate 928 may then compress data.

In a similar fashion, cross domain guard 910 sends data 934 to weapon server 920 through filter gate 922. Filter gate 922 may process data 934 such that weapon server 920 can use data 934 in the illustrative example.

In this depicted example, training processor 900 has channel 929, channel 931, channel 933, and channel 935. Channel 929, channel 931, channel 933, and channel 935 may have the same or different levels of permission. For example, data may be sent to and received with a "top secret" permission level on channel 929 while data may be sent at a "secret" permission level over channel 931. Further, data may be sent to and received from channel 933 with a top secret permission level while data on channel 935 may be designated "secret, no foreign." Of course, channel 929, channel 931, channel 933, and channel 935 may have other types of permission levels, depending on the particular implementation.

In this illustrative example, cross domain guard 910 does not send data from model 916 to foreign processing software 924. In this example, foreign processing software 924 may have a lower permission level than model 916, processor unit 904, and weapon server 920 such that cross domain guard 910 does not transmit data 930 to foreign processing software 924 in any form.

In some illustrative examples, the permission level of one or more components in training processor 900 receiving data 930 may be the same or greater than the permission level of data 930. In this example, cross domain guard 910 may not modify data 930 at all and transmit data 930 directly to weapon server 920, processor unit 904, or foreign processing software 924. In this manner, cross domain guard 910 sends data to a desired location based on the permission levels of different components in training processor 900.

Figure 10:
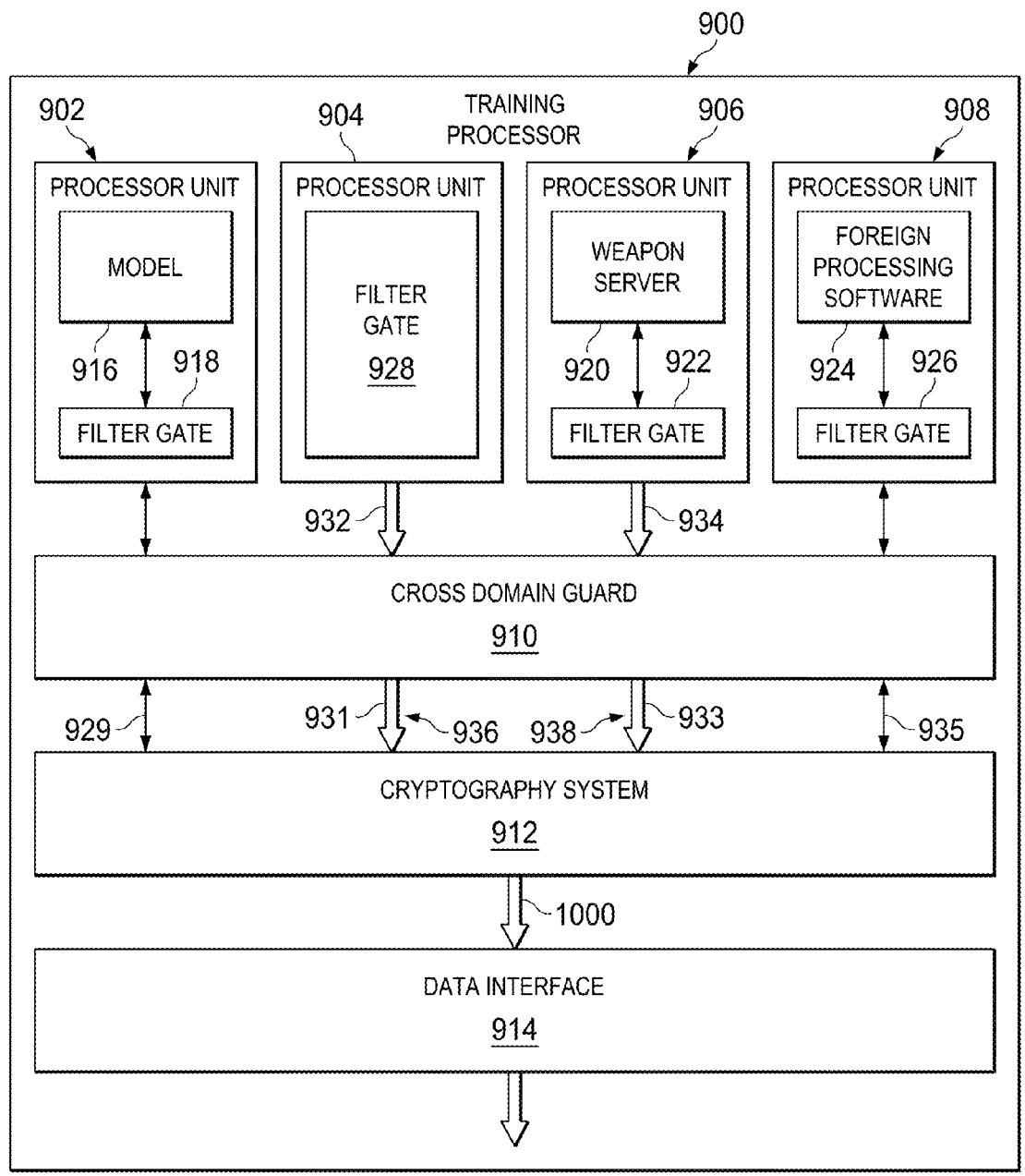
FIG. 10 is another illustration of data flow in a training processor in accordance with an illustrative embodiment.

In FIG. 10, another illustration of data flow in a training processor is depicted in accordance with an illustrative embodiment. In this illustrative example, data 932 is sent back to cross domain guard 910 from processor unit 904 over channel 931. In the same manner, data 934 is sent back to cross domain guard 910 from weapon server 920 over channel 933.

Data 934 from weapon server 920 may now include detonation data. Detonation data is data about the detonation of the missile fired by model 916 in this example.

Cross domain guard 910 may then modify data 932, data 934, or both data 932 and data 934 such that the data is sent to cryptography system 912 at a desired permission level. For example, cross domain guard 910 may modify data 932 to form data 936 and may also modify data 934 to form data 938. Cross domain guard 910 sends data 932 to cryptography system 912 over channel 931. Cross domain guard 910 sends data 934 to cryptography system 912 over channel 933. In turn, cryptography system 912 encrypts data 932 and data 934 and combines data 932 and data 934 to form encrypted data 1000. Encrypted data 1000 is then sent to data interface 914 for transmission to a destination location.

Figure 11:
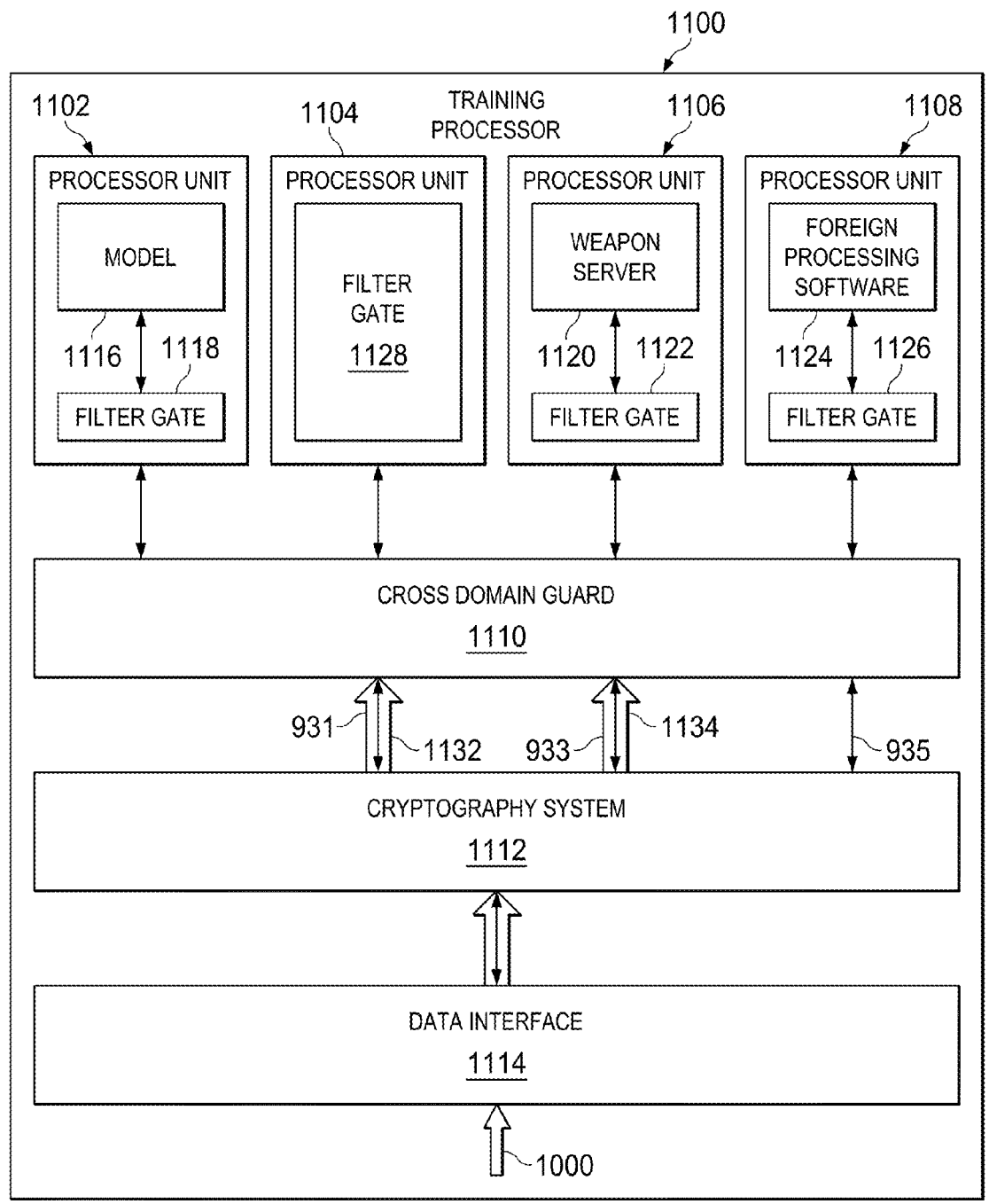
FIG. 11 is yet another illustration of data flow in a training processor in accordance with an illustrative embodiment.

Turning now to FIG. 11, yet another illustration of data flow in a training processor is depicted in accordance with an illustrative embodiment. Training processor 1100 is an example of an implementation for training processor 600 in FIG. 6. Training processor 1100 receives encrypted data 1000 from training processor 900 in this illustrative example.

As depicted, training processor 1100 includes processor unit 1102, processor unit 1104, processor unit 1106, processor unit 1108, cross domain guard 1110, cryptography system 1112, and data interface 1114. In this illustrative example, each processor unit may perform different functions than the other processor units.

In this depicted example, processor unit 1102 runs model 1116 with filter gate 1118, processor unit 1106 runs weapon server 1120 with filter gate 1122, and processor unit 1108 runs foreign processing software 1124 with filter gate 1126. Processor unit 1104 does not run software in this particular example but contains filter gate 1128.

As depicted, training processor 1100 has channel 931, channel 933, and channel 935. Channel 931, channel 933, and channel 935 may have the same or different levels of permission. For example, data may be sent to and received with a secret permission level on channel 931 and channel 933, while data on channel 935 may be designated secret, no foreign. Of course, channel 931, channel 933, and channel 935 may have other types of permission levels, depending on the particular implementation. In this depicted example, a fourth channel is absent from training processor 1100. As a result, training processor 1100 may not be able to process data at a top secret permission level. In other words, training processor 900 may have a top secret permission level and training processor 1100 may have a secret permission level. Thus, training processor 1100 may not receive top secret data.

In this illustrative example, encrypted data 1000 is received by data interface 1114 and sent to cryptography system 1112. Cryptography system 1112 decrypts encrypted data 1000 and sends a portion of encrypted data 1000 in the form of data 1132 to cross domain guard 1110 over channel 931. Similarly, cryptography system 1112 sends a portion of encrypted data 1000 in the form of data 1134 to cross domain guard 1110 over channel 933. No data is sent over channel 935 in this illustrative example.

When cryptography system 1112 decrypts encrypted data 1000, cryptography system 1112 uses specific keys. The type of keys available to cryptography system 1112 may be based on the level of permission of training processor 1100. As a result, even if training processor 900 sent encrypted data 1000 to training processor 1100 with a portion of encrypted data 1000 having a top secret permission level, cryptography system 1112 in training processor 1100 may not contain the key to decrypt that portion of encrypted data 1000.

Figure 12:
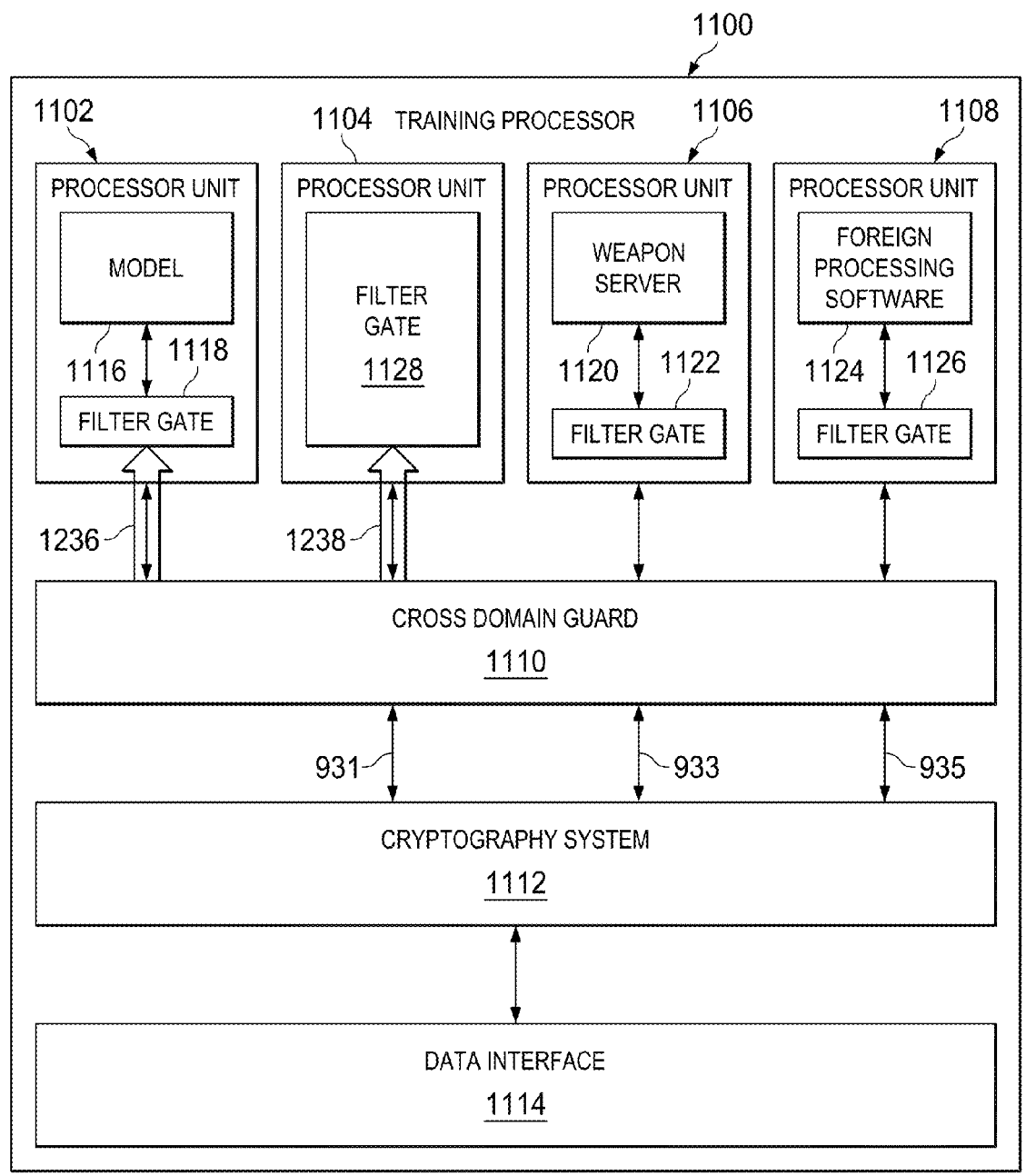
FIG. 12 is still another illustration of data flow in a training processor in accordance with an illustrative embodiment.

With reference now to FIG. 12, still another illustration of data flow in a training processor is depicted in accordance with an illustrative embodiment. In this illustrative example, cross domain guard 1110 has modified data 1132 and data 1134 based on the permission level of the destination location of data 1132 and data 1134 in FIG. 11.

In particular, cross domain guard 1110 may apply a set of rules to data 1132 such that cross domain guard 1110 modifies data 1132 to form data 1236 for model 1116 at a desired permission level. Additionally, cross domain guard 1110 may apply a set of rules to data 1134 such that cross domain guard 1110 modifies data 1134 to form data 1238 for processor unit 1104 at a desired permission level. Model 1116 and processor unit 1104 may have the same or different permission levels in this illustrative example. As a result, cross domain guard 1110 provides data 1236 to model 1116 and data 1238 to processor unit 1104 with the appropriate permission level.

In this illustrative example, data 1236 and data 1238 may include entity state data, emission data, detonation data, other suitable types of data, or a combination thereof. Filter gate 1118 in model 1116 and filter gate 1128 in processor unit 1104 may continue to process data 1236 and data 1238, respectively, to perform operations within training processor 1100. As an example, with data 1236 and data 1238, training processor 1100 may indicate that the platform housing training processor 1100 has been hit by the missile fired by the platform housing training processor.

Figure 13A:
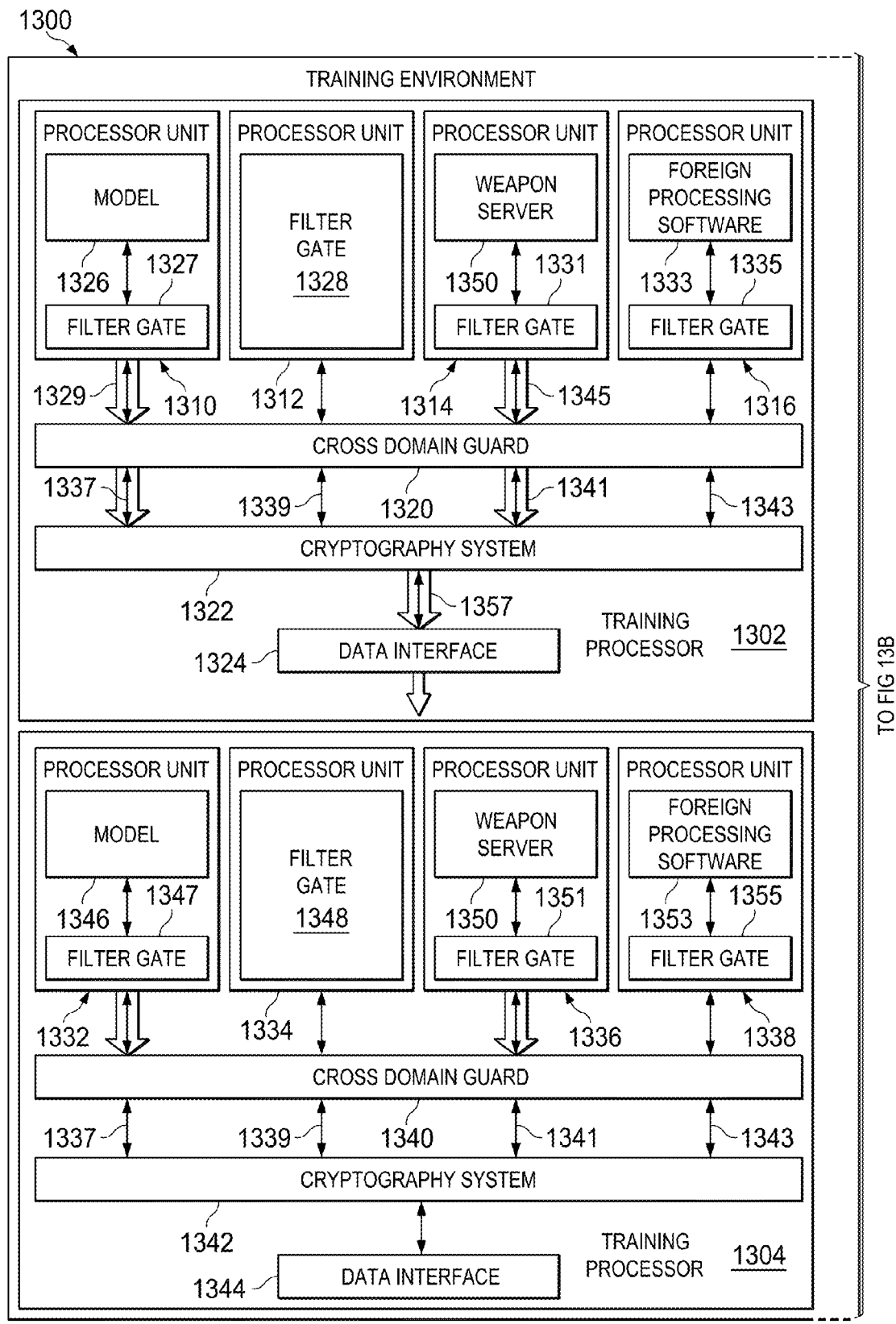
FIGS. 13A and 13B are an illustration of data flow between processors in a group of training processors in accordance with an illustrative embodiment.
Figure 13B:
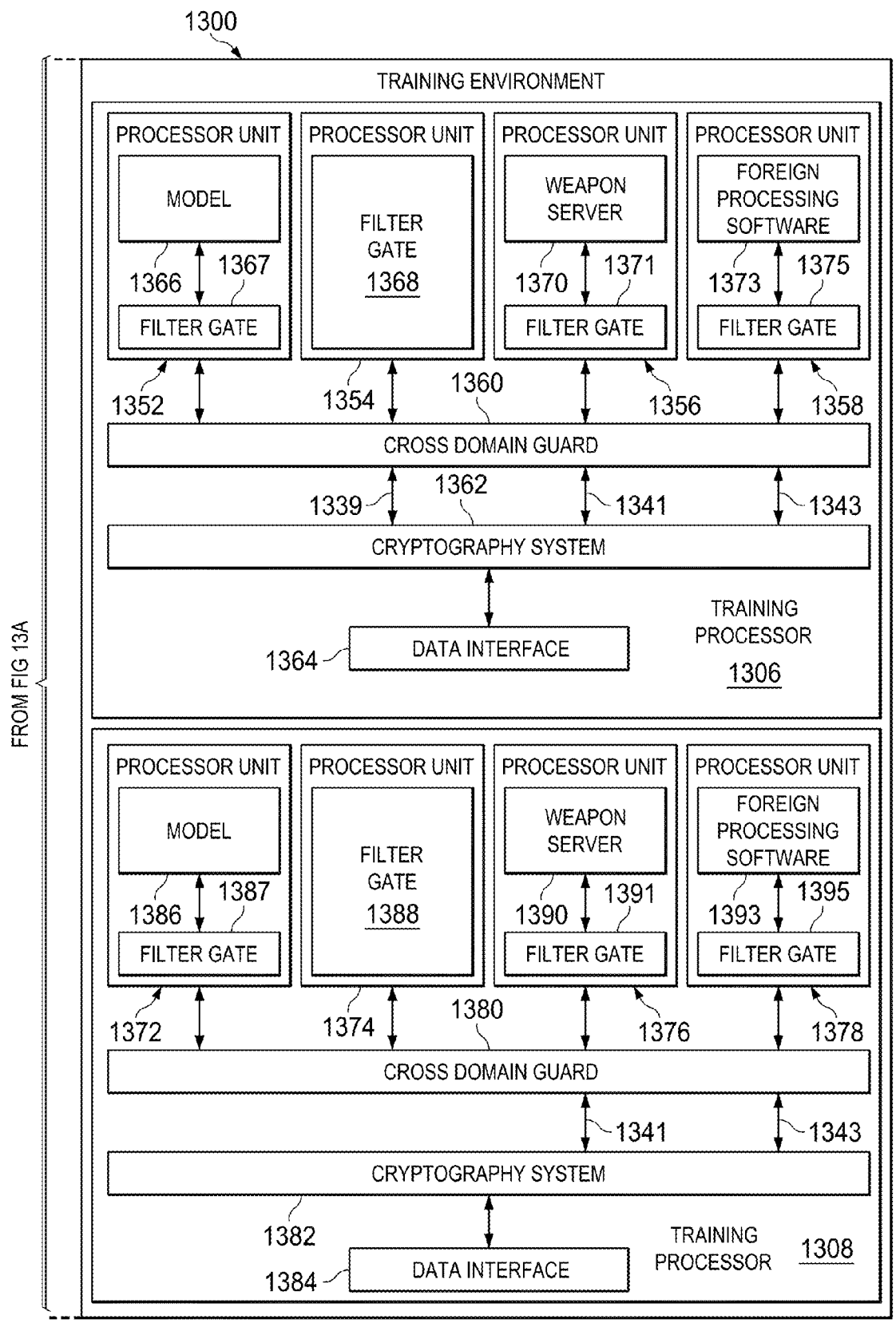

In FIGS. 13A and 13B, an illustration of data flow between processors in a group of training processors is depicted in accordance with an illustrative embodiment. In this illustrative example, training environment 1300 includes training processor 1302, training processor 1304, training processor 1306, and training processor 1308. Training processor 1302, training processor 1304, training processor 1306, and training processor 1308 are examples of implementations for training processor 600 in FIG. 6.

As depicted, training processor 1302 includes processor unit 1310, processor unit 1312, processor unit 1314, processor unit 1316, cross domain guard 1320, cryptography system 1322, and data interface 1324. Training processor 1304 includes processor unit 1332, processor unit 1334, processor unit 1336, processor unit 1338, cross domain guard 1340, cryptography system 1342, and data interface 1344. Training processor 1306 includes processor unit 1352, processor unit 1354, processor unit 1356, processor unit 1358, cross domain guard 1360, cryptography system 1362, and data interface 1364. Training processor 1308 includes processor unit 1372, processor unit 1374, processor unit 1376, processor unit 1378, cross domain guard 1380, cryptography system 1382, and data interface 1384.

In this illustrative example, processor unit 1310 runs model 1326 with filter gate 1327, processor unit 1312 does not run software but contains filter gate 1328, processor unit 1314 runs weapon server 1350 with filter gate 1331, and processor unit 1316 runs foreign processing software 1333 with filter gate 1335. Training processor 1302 has channel 1337, channel 1339, channel 1341, and channel 1343. Training processor 1302 may have a top secret permission level in this illustrative example.

As depicted, processor unit 1332 runs model 1346 with filter gate 1347, processor unit 1334 does not run software but contains filter gate 1348, processor unit 1336 runs weapon server 1350 with filter gate 1351, and processor unit 1338 runs foreign processing software 1353 with filter gate 1355. Training processor 1304 has channel 1337, channel 1339, channel 1341, and channel 1343. Training processor 1304 may also have a top secret permission level in this illustrative example.

In this illustrative example, processor unit 1352 runs model 1366 with filter gate 1367, processor unit 1354 does not run software but contains filter gate 1368, processor unit 1356 runs weapon server 1370 with filter gate 1371, and processor unit 1358 runs foreign processing software 1373 with filter gate 1375. Training processor 1306 has channel 1339, channel 1341, and channel 1343 but does not have channel 1337. Training processor 1306 may have a secret permission level in the illustrative example.

In this depicted example, processor unit 1372 runs model 1386 with filter gate 1387, processor unit 1374 does not run software but contains filter gate 1388, processor unit 1376 runs weapon server 1390 with filter gate 1391, and processor unit 1378 runs foreign processing software 1393 with filter gate 1395. Training processor 1308 has channel 1341, and channel 1343 but does not have channel 1337 and channel 1339. Training processor 1308 may have permission level of secret, no foreign in this illustrative example.

In this illustrative example, model 1326 generates data 1329 and sends data 1329 through filter gate 1327 to cross domain guard 1320. Data 1329 is entity data, emission data, or both in this particular example. Weapon server 1350 sends data 1345 through filter gate 1331 to cross domain guard 1320. Data 1345 is detonation data in this illustrative example.

As depicted, cross domain guard 1320 modifies data 1329 and data 1345 to a desired permission level. In this illustrative example, cross domain guard 1320 may downgrade data to a lower level for transmission. Cross domain guard 1320 then sends data 1329 and data 1345 to cryptography system 1322 over channel 1337 and channel 1341, respectively.

Next, cryptography system 1322 encrypts data 1329 and 1345 to form encrypted data 1357. Encrypted data 1357 is then sent to data interface 1324 for transmission to training processor 1304, training processor 1306, and training processor 1308.

Figure 14A:
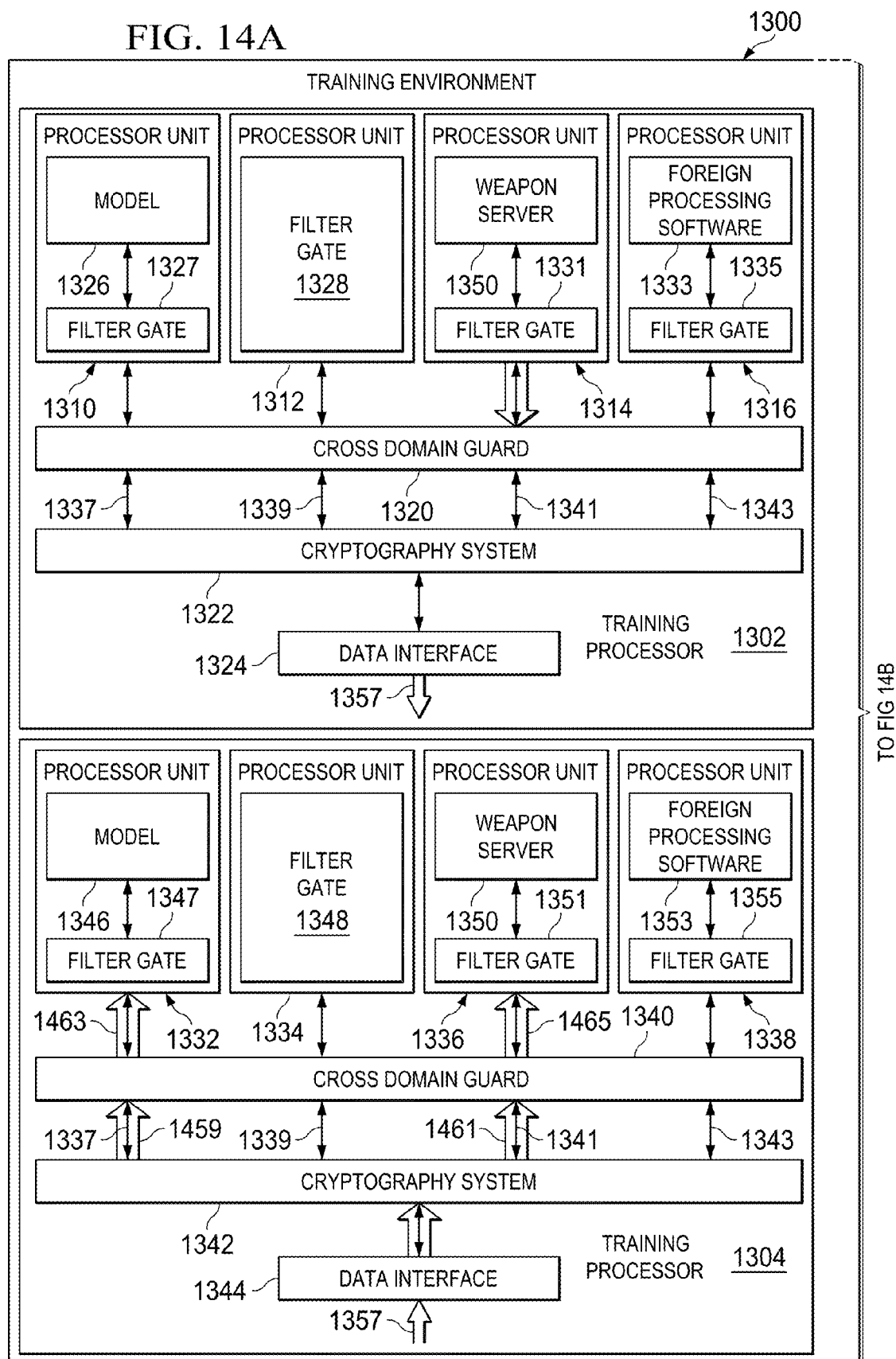
FIGS. 14A and 14B are another illustration of data flow between processors in a group of training processors in accordance with an illustrative embodiment.
Figure 14B:
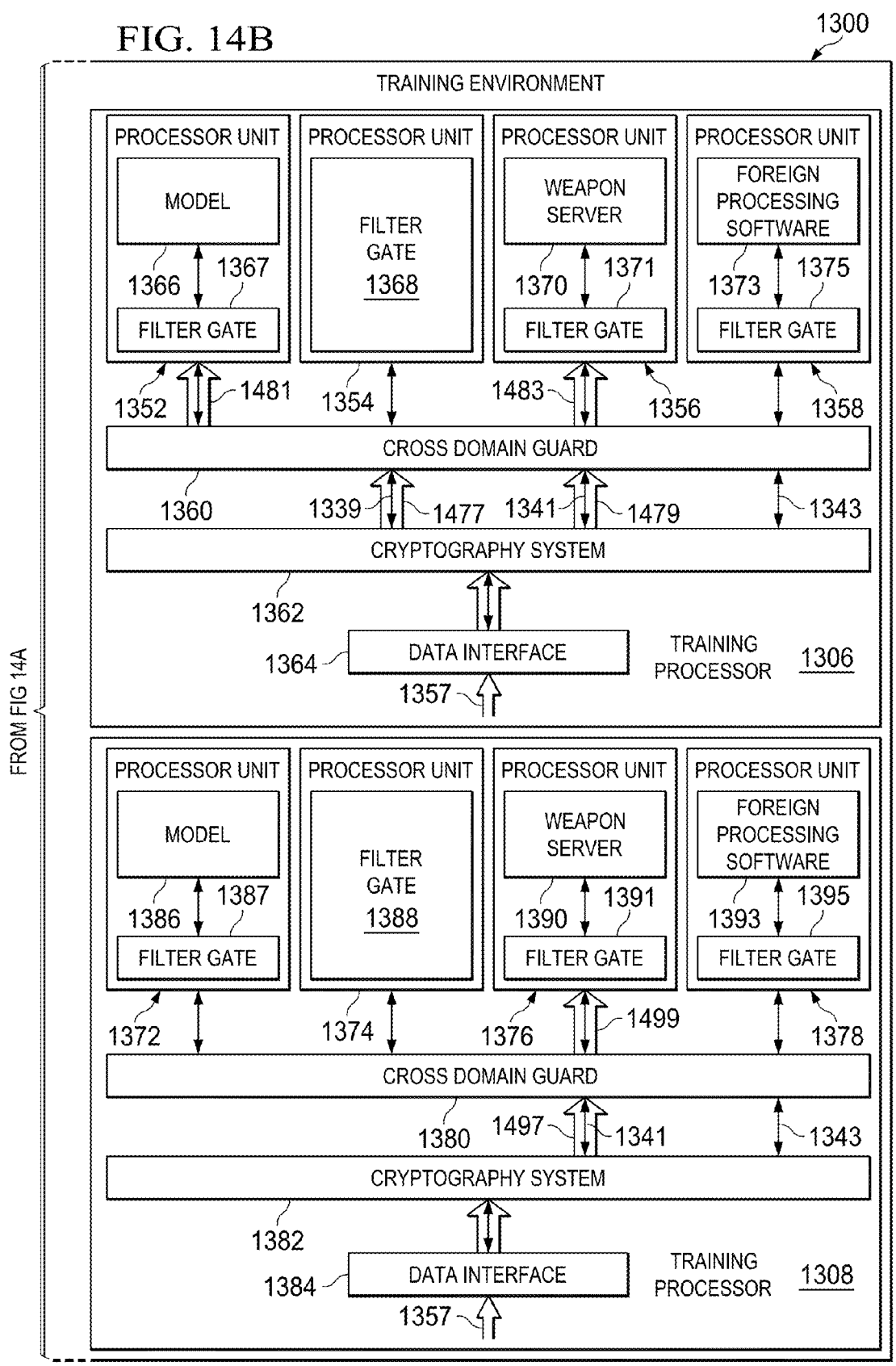

With reference now to FIGS. 14A and 14B, another illustration of data flow between processors in a group of training processors is depicted in accordance with an illustrative embodiment. In this illustrative example, training processor 1304, training processor 1306, and training processor 1308 receive encrypted data 1357 from training processor 1302.

As depicted, training processor 1304 receives encrypted data 1357 from training processor 1302 at data interface 1344. Data interface 1344 sends encrypted data 1357 to cryptography system 1342. Cryptography system 1342 decrypts encrypted data 1357 and sends the data to cross domain guard 1340 over channel 1337 and channel 1341. In particular, cryptography system 1342 may send data 1459 to cross domain guard 1340 over channel 1337 and data 1461 over channel 1341. Because training processor 1304 has the same permission level as training processor 1302, cryptography system 1322 may have the same keys as training processor 1302. Thus, cryptography system 1322 may encrypt and decrypt data with higher levels of permission in this and other illustrative examples.

In these depicted examples, cross domain guard 1340 applies a set of rules to data 1459 and data 1461 such that data 1459 has a desired permission level for transmission to model 1346 and data 1461 has a desired permission level for transmission to weapon server 1350. In this example, cross domain guard 1340 may upgrade data 1459, data 1461, or both, based on the permission levels of the components within training processor 1304. In other illustrative examples, cross domain guard 1340 may downgrade data 1459, data 1461, or both.

In other illustrative examples, the data may neither be upgraded nor downgraded. Instead, the data the merely passed through. In the illustrative examples, the upgrading and downgrading of data refers to modifying the data as needed to have the data meets a higher or lower permission level. In upgrading the data, fields for data may be added in which these fields are not present with a lower permission level. These fields may be set at an all value but available for use. At a higher permission level, the upgraded data with the additional fields may be filled in with actual values.

Next, cross domain guard 1340 sends data 1463 to model 1346. Data 1463 is data 1459 modified for model 1346 and may contain entity state data, emission data, or both. Additionally, cross domain guard 1340 sends data 1465 to weapon server 1350. Data 1465 is data 1461 modified for weapon server 1350 and may contain detonation data in this illustrative example.

As depicted, training processor 1306 also receives encrypted data 1357 from training processor 1302 at data interface 1364. Data interface 1364 sends encrypted data 1357 to cryptography system 1362. Cryptography system 1362 decrypts encrypted data 1357 and sends the data to cross domain guard 1360 over channel 1339 and channel 1341. In particular, cryptography system 1362 may send data 1477 and data 1479 to cross domain guard 1360 over channel 1339 and channel 1341, respectively.

In this example, because training processor 1306 has a lower permission level than training processor 1302, cryptography system 1362 may not have the same keys as training processor 1302. Thus, cryptography system 1362 may not encrypt and decrypt data with higher levels of permission. In other words, cryptography system 1362 may not have a key that decrypts top secret data and transmits that data over channel 1337 in this illustrative example.

In this depicted example, cross domain guard 1360 applies a set of rules to data 1477 and data 1479 such that data 1477 has a desired permission level for transmission to model 1366 and data 1479 has a desired permission level for transmission to weapon server 1370. In this example, cross domain guard 1360 may downgrade data 1477, data 1479, or both, based on the permission levels of the components within training processor 1306. In other illustrative examples, cross domain guard 1360 may upgrade data 1477, data 1479, or both.

Next, cross domain guard 1360 sends data 1481 to model 1366. Data 1481 is data 1477 modified for model 1366 and may contain entity state data, emission data, or both. Additionally, cross domain guard 1360 sends data 1483 to weapon server 1370. Data 1483 is data 1479 modified for weapon server 1370 and may contain detonation data in this illustrative example.

In this illustrative example, training processor 1308 also receives encrypted data 1357 from training processor 1302 at data interface 1384. Data interface 1384 sends encrypted data 1357 to cryptography system 1382. Cryptography system 1382 decrypts encrypted data 1357 and sends the data to cross domain guard 1380 over channel 1341. In particular, cryptography system 1382 may send data 1497 to cross domain guard 1380 over channel 1341.

In this example, because training processor 1308 has a lower permission level than training processor 1302, cryptography system 1382 may not have the same keys as training processor 1302. Thus, cryptography system 1382 may not encrypt and decrypt data with higher levels of permission. In other words, cryptography system 1382 may not have a key that decrypts top secret data and transmits the top secret data over channel 1337 in this illustrative example. Further, cryptography system 1382 may not have a key that decrypts secret data and transmits the top secret data over channel 1339.

In these depicted examples, cross domain guard 1380 applies a set of rules to data 1497 such that data 1497 has a desired permission level for transmission to weapon server 1390. In this example, cross domain guard 1380 may downgrade data 1497 based on the permission level of weapon server 1390. In other illustrative examples, cross domain guard 1380 may upgrade data 1497.

Next, cross domain guard 1380 sends data 1499 to weapon server 1390. Data 1499 is data 1497 modified for weapon server 1390 and may contain detonation data in this illustrative example.

In this manner, each cross domain guard in each training processor uses a desired permission level to modify the data sent to and from the training processor. As a result, multiple platforms in training environment 1300 may communicate with one another during a simulation.

Although training environment 1300 has been described with four training processors operating in training environment 1300, any number of training processors on any number of platforms may be present in training environment 1300. For example, two training processors, twelve training processors, twenty training processors, or some other suitable number of training processors may be used in training environment 1300. With a use of an illustrative embodiment, any number of platforms may communicate with each other based on the permission levels of the platforms.

In other illustrative examples, training processor 1302, training processor 1304, training processor 1306, and training processor 1308 may be reconfigured to have different levels of permission, depending on the particular implementation. For example, during training exercises, training processor 1302 may have a top secret level of permission for one exercise and have a secret level of permission for a different exercise. The system administrator may dynamically reconfigure components in training environment 1300, depending on the functionality involved. Further, components with a training processor may also be reconfigured.

The illustration of the components depicted in FIGS. 1-14B is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 15:
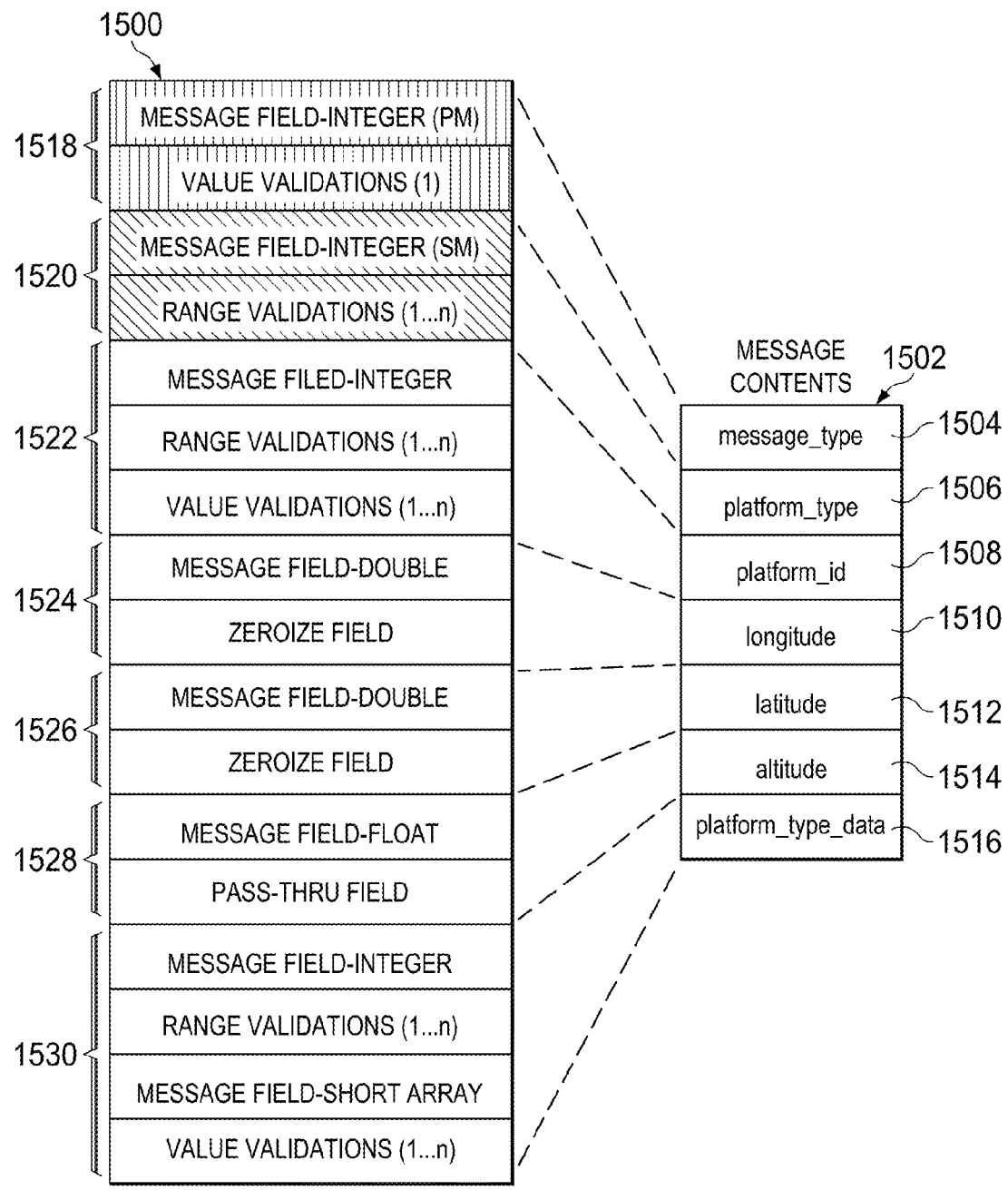
FIG. 15 is an illustration of a set of rules defining actions to be performed in modifying a message in accordance with an illustrative embodiment.

Turning now to FIG. 15, an illustration of a set of rules defining actions to be performed in modifying a message is depicted in accordance with an illustrative embodiment. As depicted, message rule 1500 is one example of an implementation for a rule in the set of rules in policy 316 in FIG. 3. In this illustrative example, message rule 1500 may be one, three, ten, fifteen, or some other suitable number of rules for a message.

In the illustrative example in this figure, each rule performs a specific action to a message field of a particular data type within message 1502. The actions performed in message rule 1500 include, for example, value validations, range validations, "zeroize" functions, and pass-thru functions. In these examples, "zeroize" means to set the current field value to zero.

In this illustrative example, message rule 1500 may be used by data controller 300 to upgrade or downgrade data based on plurality of permission levels 304 in FIG. 3. In particular, message rule 1500 may be used by cross domain guard 610 to process data within training processor 600 in FIG. 6.

As depicted, message rule 1500 may be based on the contents of message 1502. Message 1502 may contain a number of different fields of data.

In this illustrative example, message 1502 includes message type 1504, platform type 1506, platform identifier 1508, longitude 1510, latitude 1512, altitude 1514, and platform type data 1516. In other illustrative examples, message 1502 may contain other fields in addition to or in place of the ones illustrated in this example.

In this illustrative example, message type 1504 identifies the type of message depicted by message 1502. In other words, message type 1504 may indicate the type of data that is present in message 1502. Platform type 1506 is the type of platform generating message 1502. For example, platform type 1506 may be a ship, an aircraft, a rotorcraft, a submarine, a spacecraft, a truck, tank, a personnel carrier, an antiaircraft battery, or some other suitable type of platform.

In this depicted example, platform identifier 1508 is a unique identifier for platform type 1506 that is generating message type 1504 as defined by message 1502. For example, platform identifier 1508 may be a particular ship in a group of ships. Of course, platform identifier 1508 may identify the platform in a different manner, depending on the particular implementation.

Longitude 1510, latitude 1512, and altitude 1514 may be used to identify the three-dimensional coordinates of the platform in space. Platform type data 1516 may be data based on platform type 1506. For example, platform type data 1516 may be different for a truck than for an aircraft. Additionally, platform type data 1516 may vary depending on the type of aircraft used. For example, platform type data 1516 may be different for a rotorcraft than an unmanned aerial vehicle. In other words, depending on the classification of platform type 1506, platform type data 1516 may be more or less detailed.

In this illustrative example, message rule 1500 may be applied to message 1502 and the fields within message 1502. To determine whether message rule 1500 should be applied to message 1502, message rule 1500 uses primary match field 1518 and secondary match field 1520.

In one example, primary match field 1518 may indicate that message 1502 is generated by a sensor in the platform. Secondary match field 1520 may indicate the particular type of sensor, the manufacturer of the sensor, the model of the sensor, or some combination thereof. In this illustrative example, primary match field 1518 and secondary match field 1520 may be located anywhere within message 1502. In other words, primary match field 1518 and secondary match field 1520 may be any type of field within message 1502.

Primary match field 1518 and secondary match field 1520 are generally the fields in message 1502 that will differentiate message 1502 from other messages. In other words, by validating primary match field 1518 and secondary match field 1520, cross domain guard 610 in FIG. 6 may determine whether or not message rule 1500 should be used to modify message 1502 in this illustrative example.

As a result, the action performed on primary match field 1518 and secondary match field 1520 yields a unique message type with a defined rule set. In this illustrative example, the defined rule set is message rule 1500. In particular, the applicability of message rule 1500 for message 1502 is validated by using primary match field 1518 and secondary match field 1520. In this illustrative example, primary match field 1518 and secondary match field 1520 indicate that message rule 1500 and the actions in message rule 1500 should be applied to message 1502.

As depicted, primary match field 1518 is based on message type. In particular, primary match field 1518 has a value that message rule 1500 compares to a value for message type 1504 in message 1502. When the value of primary match field 1518 is applied to message 1502, a determination is made as to whether message type 1504 has the same value as primary match field 1518. In other words, a value validation is performed for primary match field 1518 and message type 1504. If the values in primary match field 1518 in message rule 1500 and message type 1504 in message 1502 are the same, the process continues to validate the message using secondary match field 1520. If the values in primary match field 1518 in message rule 1500 and message type 1504 in message 1502 are not the same, message rule 1500 does not apply to message 1502. In this case, the additional actions in message rule 1500 are not performed on message 1502.

In this illustrative example, secondary match field 1520 is used to further narrow potential rules for message 1502. Secondary match field 1520 may be used to match a range of values in message rule 1500 to a value in platform type 1506 in message 1502. In other words, if the value of platform type 1506 in message 1502 is within a predetermined range in secondary match field 1520, secondary match field 1520 will indicate a match for message 1502. Thus, a range validation is performed in this illustrative example. When both primary match field 1518 and secondary match field 1520 indicate a match, the actions in message rule 1500 for the remainder of the data fields in message 1502 are applied to message 1502. Conversely, if secondary match field 1520 does not match platform type 1506, message rule 1500 does not apply to message 1502 and the additional actions in message rule 1500 are not performed on message 1502.

In this illustrative example, primary match field 1518 and secondary match field 1520 match message type 1504 and platform type 1506, respectively, in message 1502. Based on the content of message 1502, message rule 1500 contains instructions for processing the other fields of data in message 1502. This processing may be completed in cross domain guard 610 in FIG. 6. These instructions may include a single action or multiple actions to be performed on each field in message 1502. In other words, these instructions may include one action, two actions, six actions, or some other number of actions to be performed on each field in message 1502.

As depicted, action field 1522 validates a desired number of ranges and a desired number of values against the value of platform identifier 1508 in message 1502. In other words, action field 1522 may perform a validation of one range and one value, two ranges and three values, ten ranges and twelve values, or some other number of ranges and number of values. The desired number of range validations and the desired number of value validations is determined by the contents of a message.

In this illustrative example, a system administrator determines which fields in a message are appropriate for a particular permission level. Further, the system administrator defines the allowed values and ranges for message fields at a particular permission level. These values and ranges may change when the training environment changes. In this example, the system administrator determines the number of range validations and value validations that occur in action field 1522, as well as the actions performed in the other fields in message rule 1500.

Action field 1524 instructs cross domain guard 610 to zeroize longitude 1510. When cross domain guard 610 zeroizes a field, the original data stored in that message field is changed to zero before message 1502 is sent to the destination location. In other words, cross domain guard 610 clears the data about longitude 1510 from message 1502. In this manner, the processor unit receiving the cleared data will never receive a valid value for longitude 1510.

Similarly, action field 1526 for latitude 1512 in message 1502 will zeroize latitude 1512 before sending message 1502 to a destination device. In this manner, both longitude 1510 and latitude 1512 may be downgraded to the appropriate security level for the processor unit receiving the data.

Alternatively, in another illustrative example, a message rule may perform a "strip action" on message fields containing data such as longitude, latitude, or other suitable types of data. A strip action occurs when the field is completely removed from the message. As an example, if message rule 1500 included an action to "strip" longitude 1510, the field would be completely removed from message 1502. In other words, longitude 1510 would no longer exist in message 1502 sent to the destination location.

In this depicted example, the action field in message rule 1500 is dependent on the particular policies that are enforced for each training environment. In other words, one training environment may zeroize longitude 1510 while another training environment may strip longitude 1510, depending on the functionality involved.

In this illustrative example, data in message 1502 may be modified for many different reasons. For example, if the transmitting platform has a top secret permission level, which allows the platform to view longitude 1510 and latitude 1512, then that data will be passed through to the top secret platform. Conversely, if the receiving platform only has a secret clearance, some data may be stripped by cross domain guard 610 such that only data classified at the appropriate permission level is sent to the destination device. In this manner, cross domain guard 610 may control data flow based on a number of permission levels for each type of data in message 1502.

In this depicted example, action field 1528 instructs cross domain guard to pass through altitude 1514. Thus, the destination device receives altitude 1514 of the platform but does not receive longitude 1510 or latitude 1512. As a result, the destination location may not be able to identify where the platform is located in three-dimensional space.

In this illustrative example, action field 1530 tells cross domain guard 610 to perform range validations and value validations on platform type data 1516. After message rule 1500 has been applied to message 1502, the modified contents of message 1502 are sent to the destination device. For example, modified contents of message 1502 may be sent to a processor unit in training processor 600 in FIG. 6 after passing through cross domain guard 610 with message rule 1500 being applied to message 1502. In this manner, cross domain guard 610 may upgrade or downgrade data to the appropriate permission level using policy 316 with message rule 1500 and other sets of rules for other types of message 1502.

Illustration of message rule 1500 and message 1502 are not meant to imply limitations to the manner in which other message rules and messages may be implemented. For example, actions in a rule may include other actions in addition to or in place of the ones illustrated in message rule 1500. The type of actions that may be performed for a rule may vary and may be dependent on the type of actions required to properly modify message data to meet a new permission level. In still other illustrative examples, the types of actions performed may change based on the policies for a particular training environment or for other suitable reasons, depending on the particular implementation.

Although message 1502 has been shown with seven fields in this depicted example, other numbers of fields may be present in message 1502. In turn, other numbers of rules may be present in message rule 1500 based on the number of fields in message 1502. For example, two fields, ten fields, twenty fields, or some other suitable number of fields may be present in message 1502. In a similar fashion, two rules, ten rules, twenty rules, or some other number of rules may be present in message rule 1500. For each additional field in message 1502 that is present, a different message rule may also be present.

Further, primary match field 1518 and secondary match field 1520 may not be located in a specific portion of message 1502 as shown in the figure. As an example, primary match field 1518 may not correlate to the first field in message 1502 and secondary match field 1520 may not correlate to the second field in message 1502. In other words, primary match field 1518 and secondary match field 1520 may be located in any portion of message 1502.

Figure 16:
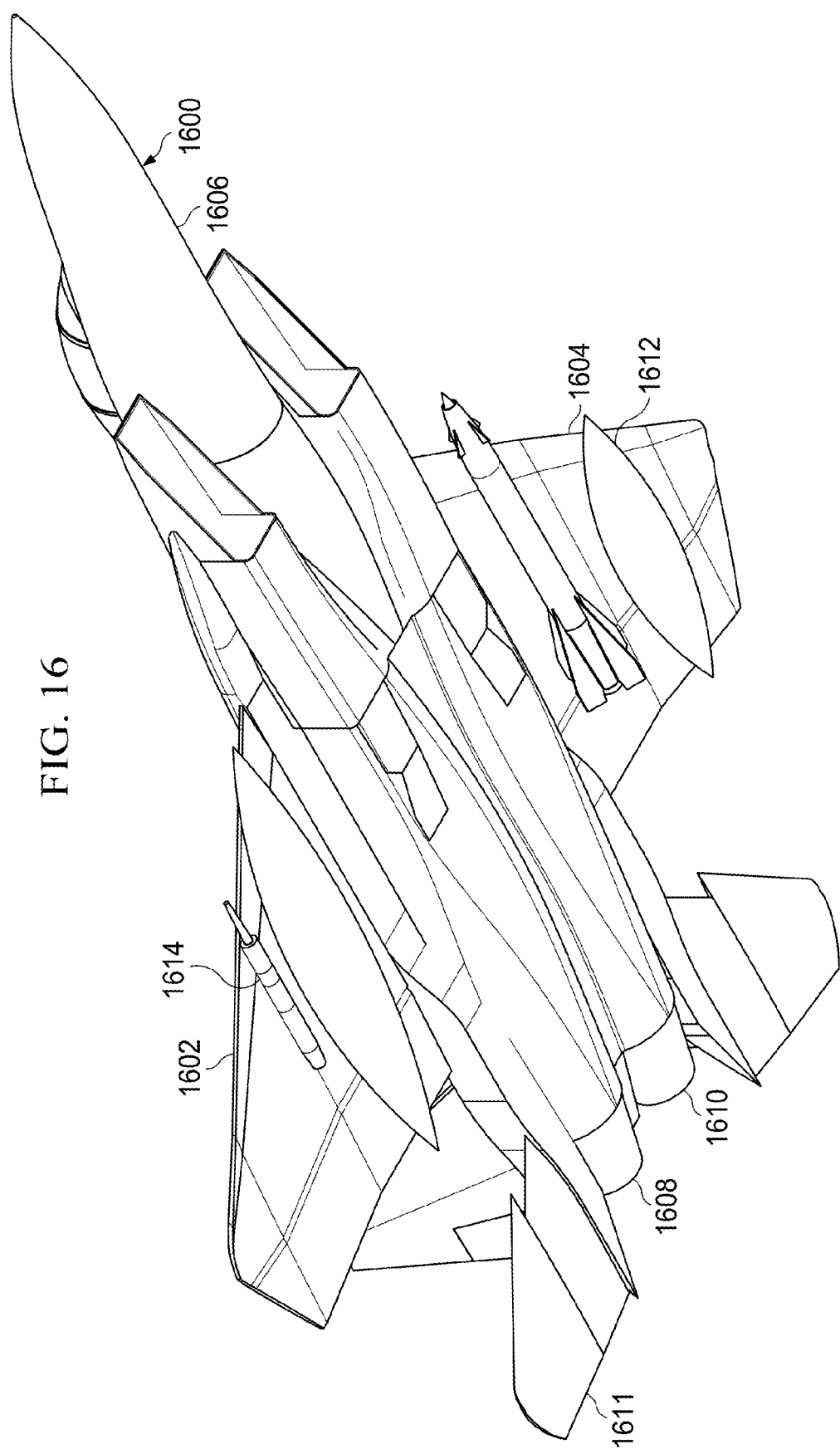
FIG. 16 is an illustration of an aircraft in accordance with an illustrative embodiment.

With reference now to FIG. 16, an illustration of an aircraft is depicted in accordance with an illustrative embodiment. Aircraft 1600 is an example of a physical implementation of platform 400 in FIG. 4 when platform 400 takes the form of aircraft.

In this illustrative example, aircraft 1600 has wing 1602 and wing 1604 attached to body 1606 of aircraft 1600. Engine 1608 and engine 1610 are connected to body 1606. Additionally, aircraft 1600 has tail section 1611. In these depicted examples, aircraft 1600 has pod 1612. In these depicted examples, an illustrative embodiment may be implemented using pod 1614. Pod 1614 may include a training processor such as training processor 500 in FIG. 5 or training processor 600 in FIG. 6.

Figure 17:
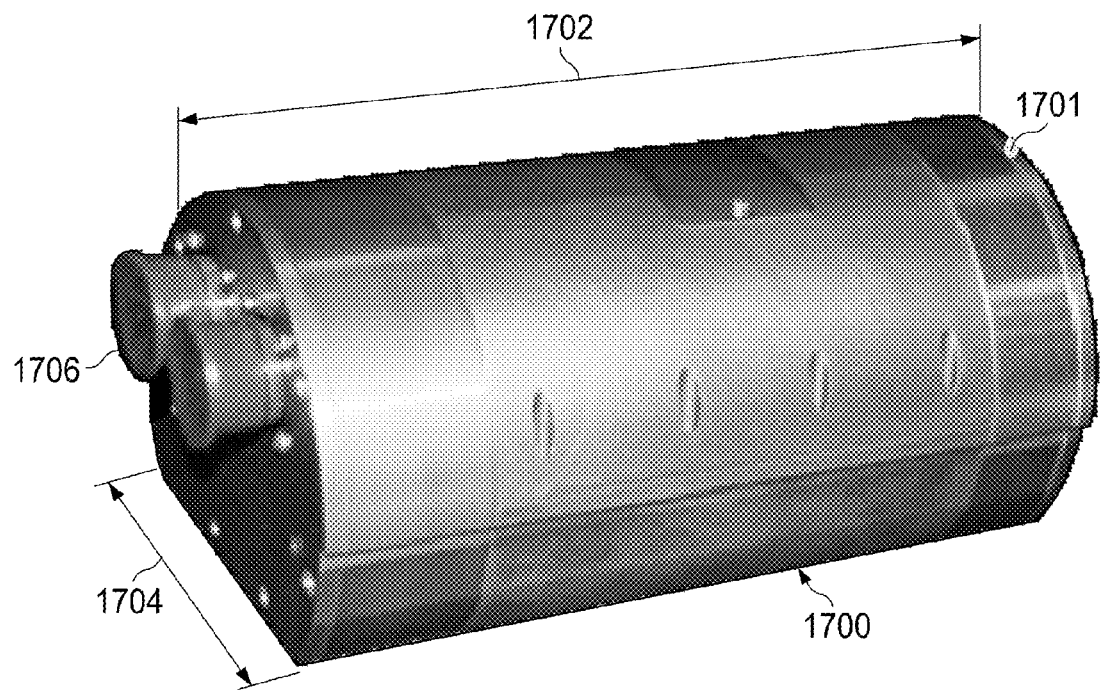
FIG. 17 is an illustration of a training processor in accordance with an illustrative embodiment.

Turning now to FIG. 17, an illustration of a training processor is depicted in accordance with an illustrative embodiment. In this illustrative example, training processor 1700 is an example of an implementation of training processor 500 in FIG. 5 or training processor 600 in FIG. 6.

In this illustrative example, training processor 1700 has a shape configured for placement into pod 1614. In this example, housing 1701 of training processor 1700 has length 1702 and width 1704. Length 1702 may be, for example, about 8.5 inches. Width 1704 may be about 4.5 inches in this illustrative example. Of course, housing 1701 of training processor 1700 may have any shape that can be placed into a pod such as pod 1614.

Housing 1701 has connectors 1706. These connectors are configured to be connected to a pod interface such as a weapons bus.

Figure 18:
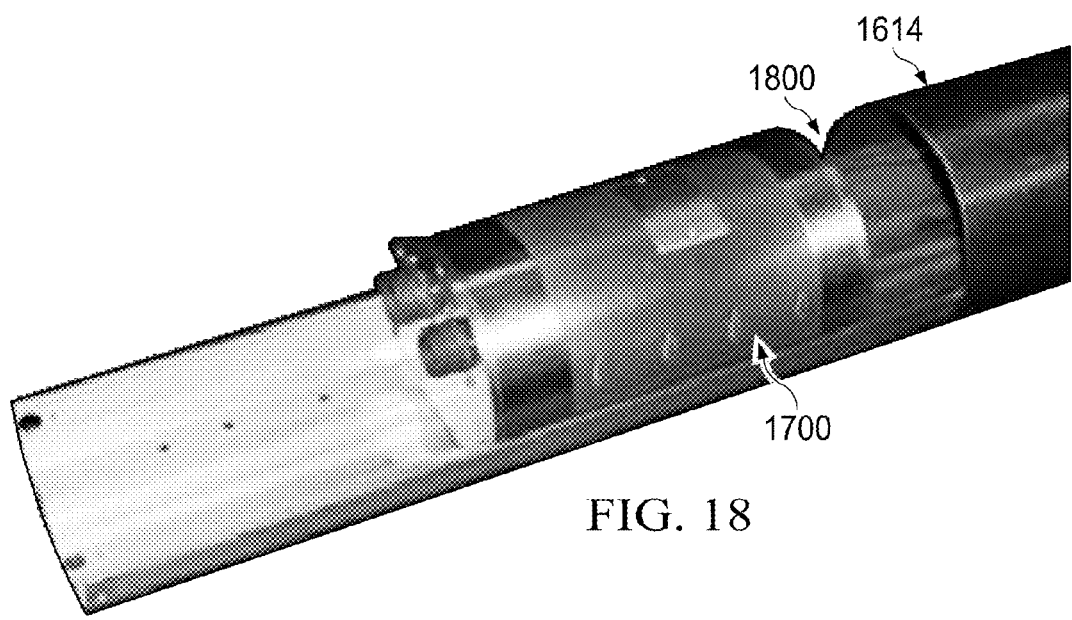
FIG. 18 is an illustration of a training processor in a pod in accordance with an illustrative embodiment.

Turning now to FIG. 18, an illustration of a training processor in a pod is depicted in accordance with an illustrative embodiment. In this illustrative example, training processor 1700 is shown in pod 1614. A cover for pod 1614 has been removed to allow for placement of training processor 1700 into pod 1614. As can be seen, training processor 1700 has a shape configured for placement into interior 1800 of pod 1614. Further, pod 1614 also may include other components used for training exercises in addition to training processor 1700.

Examples of other components that may be present in pod 1614 include, for example, a network interface, a computer, a power supply, a global positioning system receiver, a recording system to record missions for post mission analysis, and other suitable devices.

The illustration of aircraft 1600 and training processor 1700 are not meant to imply physical or architectural limitations to the manner in which an illustrative embodiment may be implemented. Other types of aircraft and other shapes for training processors may be used in other illustrative embodiments. For example, although training processor 1700 is shown as a component in a housing that is placed into pod 1614, training processor 1700 may be implemented differently in other illustrative embodiments.

For example, training processor 1700 may be built into pod 1614 rather than as a removable component for pod 1614. In this example, pod 1614 may, in essence, be training processor 1700. In another illustrative example, training processor 1700 may be placed into a platform such as aircraft 1600. In still other illustrative examples, training processor 1700 may be integrated as part of aircraft 1600.

Figure 19:
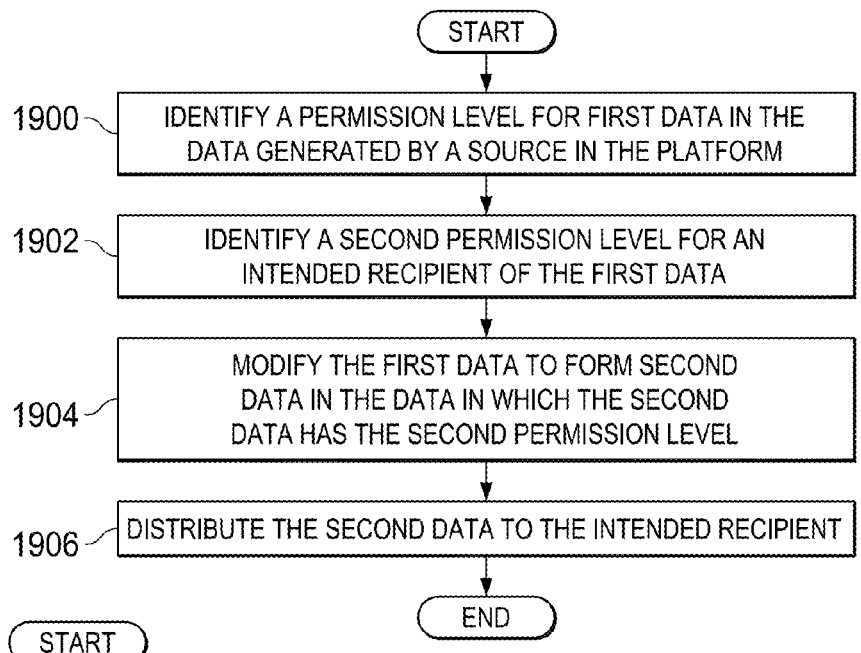
FIG. 19 is an illustration of a flowchart of a process for managing data in a platform in accordance with an illustrative embodiment.

With reference now to FIG. 19, an illustration of a flowchart of a process for managing data in a platform is depicted in accordance with an illustrative embodiment. The process illustrated in FIG. 19 may be implemented in training environment 200 in FIG. 2. In particular, the process may be implemented in number of data controllers 242 in data control system 240 in FIG. 2.

The process begins by identifying a permission level for first data in the data generated by a source in the platform (operation 1900). In this illustrative example, the source may take various forms. For example, the source may be a processor unit, software, a model, or some other suitable component.

The process then identifies a second permission level for an intended recipient of the first data (operation 1902). In operation 1902, a second policy is used to identify the second permission level for the intended recipient of the first data.

The process modifies the first data to form second data in the data in which the second data has the second permission level (operation 1904). The first data is modified using the policy. The policy identifies a number of modifications to the first data needed to form the second data with the second permission level.

The process then distributes the second data to the intended recipient (operation 1906) with the process terminating thereafter. The distribution of the second data may involve sending the data to another component within the platform. A communications link may be used to send the second data to the other component within the platform. This communications link may be, for example, a wire, an optical fiber, a wireless communications link, or some other suitable communications link.

In other illustrative examples, the second data may be distributed to the intended recipient located in another platform or location that is remote to the platform. When the second data is sent to another platform or location remote to the platform in which the first data is generated, the second data is transmitted over a wireless communications link to the intended recipient.

Figure 20:
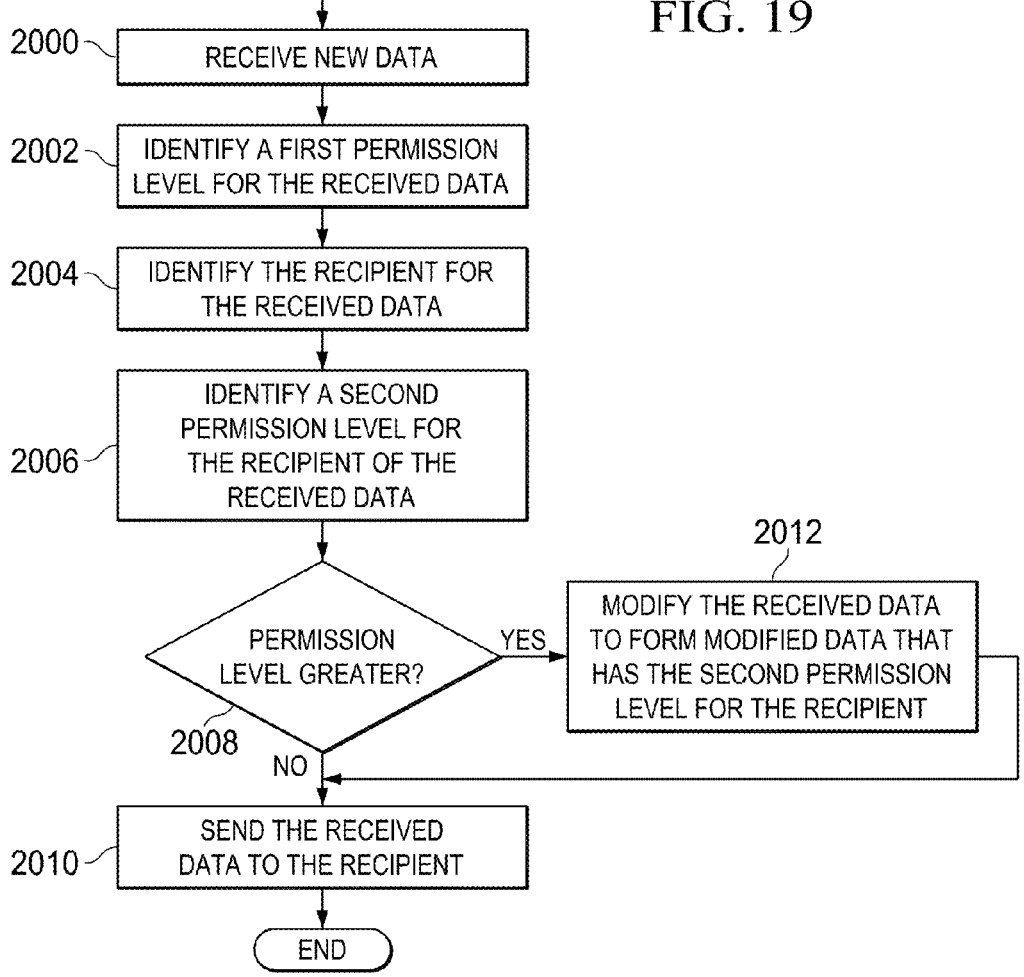
FIG. 20 is an illustration of a flowchart of a process for receiving data in accordance with an illustrative embodiment.

Turning now to FIG. 20, an illustration of a flowchart of a process for receiving data is depicted in accordance with an illustrative embodiment. The process illustrated in FIG. 20 may be implemented in training environment 200 in FIG. 2. In particular, the process may be implemented in data control system 240.

The process begins by receiving new data (operation 2000). This new data may be referred to as received data. A first permission level for the received data is identified (operation 2002). This permission level may be identified based on the content of the received data. The recipient for the received data is also identified (operation 2004). A second permission level is identified for the recipient of the received data (operation 2006).

In the different illustrative examples, the recipient for the data may be identified in a number of different ways. For example, different recipients may be assigned different channels in communications links. As another example, if more than one recipient monitors a particular communications link, the recipient may examine the data to determine whether the data is directed towards the particular recipient. In this case, the data may be located in a message with a header that identifies the recipient. In this example, all of the recipients that may examine the message should have the desired permission level for the data. In some illustrative examples, a device, such as a switch, a cross domain guard, a router, or some other device may identify the recipient using a rule in a policy. Of course, other mechanisms may be used to identify the recipient for the data.

A determination is made as to whether the first permission level for the received data is greater than the second permission level for the recipient (operation 2008). If the first permission level for the received data is not greater than the second permission level of the recipient, the process sends the received data to the recipient (operation 2010) with the process terminating thereafter.

Otherwise, the process modifies the received data to form modified data that has the second permission level for the recipient (operation 2012). The process then proceeds to operation 2010 as described above.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, an operation that encrypts the second data may be added to the operations illustrated in the flowchart in FIG. 19. As another example, a compression operation may be added to the flowchart in FIG. 19 to compress the data for transmission over a wireless communications link. In a similar fashion, an operation to decrypt received data may be included with the different operations in the flowchart in FIG. 19.

Thus, the illustrative embodiments provide a method and apparatus for managing data in a vehicle. With the use of an illustrative embodiment, the security of data being transmitted between platforms in a training environment may be enhanced. The illustrative embodiments allow processing of data such that the platform and components within the platform transmits and receives communications with the appropriate security level. In other words, with the use of an illustrative embodiment, a platform with secret clearance would not be allowed to view top secret data. As a result, data flow to different platforms with different levels of permission may occur more efficiently and securely than with currently used processing systems.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and Digital Versatile Disc (DVD).

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters which are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
   a computer that comprises a training processor configured to be connected to a vehicle, wherein such that the training processor comprises code programmed is further configured to:
      distribute data generated by the vehicle at a plurality of permission levels based on content of the data;
      identify a first permission level for first data in the data, wherein the first permission level is based on a content of the first data;
      identify a second permission level for an intended recipient of the first data; identify a portion of the content of the first data requiring a higher permission level than the second permission level;

transform, using a filter in a cross domain guard within a security module in the training processor, the content of the first data via at least one of:
a removal of the portion of the content of the first data that lacks the higher permission level; and
a modification of the first data to form a second data that conforms to the second permission level; and
distribute the second data to the intended recipient.

2. The apparatus of claim 1, wherein in being configured to identify the second permission level for the intended recipient of the first data, the training processor is configured to identify the second permission level for the intended recipient of the first data based on the content of the first data.

3. The apparatus of claim 2, wherein the content includes data about a source of the first data.

4. The apparatus of claim 1, wherein in being configured to modify the content of the first data to form the second data in which the second data has the second permission level, the training processor is configured to modify the content of the first data using a policy identifying a number of modifications to the content of the first data needed to form the second data with the second permission level.

5. The apparatus of claim 4, wherein the policy is configured to be changed during a training session, and wherein at least one of the first permission level for the first data and the second permission level for the intended recipient is configured to be changed during the training session or during normal operation.

6. The apparatus of claim 1, the modification of the first data comprises a replacement of phrases in the first data.

7. The apparatus of claim 1 further comprising:
a pod configured to be connected to the vehicle, wherein the training processor is located within the pod.

8. The apparatus of claim 1, wherein the training processor is integrated as part of the vehicle.

9. The apparatus of claim 1, wherein the first data is selected from at least one of constructive data, virtual data, live sensor data, simulation sensor data, live weapon data, and simulation weapon data.

10. The apparatus of claim 1, wherein the intended recipient is selected from one of a training device, hardware within a computer system, a simulation program, the training processor in the vehicle, a computer in the vehicle, a processor unit or other piece of hardware within the vehicle or other platform, a model in the training processor, another aircraft, a ground vehicle, a ship, a spacecraft, a group of vehicles, a group of platforms, a storage device in the training processor, the processor unit in the training processor, another training processor in a pod, and a server computer in a ground location.

11. The apparatus of claim 1, wherein the vehicle is selected from one of an aircraft, a surface ship, a tank, a personnel carrier, a train, a spacecraft, a commercial aircraft, a military aircraft, a space station, a satellite, a submarine, an unmanned ground vehicle, an unmanned aerial vehicle, an unmanned underwater vehicle, a ground-based robot, an automobile, and a ground vehicle.

12. An apparatus that comprises:
a computer that comprises a training processor configured to be connected to an aircraft and overcome a security inhibition of data distribution, wherein the training processor comprises a security module that comprises a cross domain guard that comprises a filter, such that the training processor configured comprises code programmed such that in operation the training processor:
distributes data generated by the aircraft during a training session at a plurality of permission levels based on a content of the data;
identifies a first permission level for first data in the data, wherein the first permission level is based on content of the first data;
identifies a second permission level for an intended recipient of the first data; identifies a portion of the content of the first data requiring a higher permission level than the second permission level;
transforms, using the filter, the content of the first data via at least one of:
a removal of the portion of the content of the first data that lacks the higher permission level; and
a modification of the first data to form a second data that conforms to the second permission level; and
distributes the second data to the intended recipient.

13. The apparatus of claim 12 further comprising:
a pod configured to be connected to the aircraft, wherein the training processor is located within the pod.

14. A method for overcoming a security preclusion of data distribution in a platform, the method comprising a training processor in a computer system executing programmed code:
identifying a first permission level for first data in data generated by a source in the platform, wherein the first permission level is based on a content of the first data;
identifying a second permission level for an intended recipient of the first data;
identifying a portion of the content of the first data requiring a higher permission than the second permission level;
modifying, by using a filter in a cross domain guard in a security module in the computer system, the content of the first data by at least one:
removing the portion of the content of the first data requiring the higher permission level; and
modifying the first data and thereby forming a second data conforming to the second permission level; and
distributing, the computer system, the second data to the intended recipient.

15. The method of claim 14, wherein identifying the second permission level for the intended recipient of the first data comprises:
identifying the second permission level for the intended recipient of the first data using a policy.

16. The method of claim 14, wherein modifying the content of the first data comprises:
using a policy identifying a number of modifications to the content of the first data needed to form the second data with the second permission level.

17. The method of claim 16 further comprising:
modifying the policy during a training session; and
modifying at least one of the first permission level for the first data and the second permission level for the intended recipient during the training session or during normal operation.

18. The method of claim 14, wherein the distributing step comprises:
transmitting the second data over a wireless communications link to the intended recipient.

19. The method of claim 14, wherein the distributing step comprises:
sending the second data to the intended recipient over a communications link to a location within the platform.

20. The method of claim 14 further comprising:
receiving, by the computer system, new data at the platform to form received data;
identifying, by the computer system, a third permission level for the received data;
identifying, by the computer system, a fourth permission level for a recipient in the platform;
modifying, by the computer system, content of the received data to form modified data that has the fourth permission level for the recipient; and
sending, by the computer system, the modified data to the recipient,
wherein the first permission level, the second permission level, the third permission level and the fourth permission level are different permission levels selected from a plurality of different permissions levels.

* * * * *

UNITED STATES PATENT AND TRADEMARK OFFICE
CERTIFICATE OF CORRECTION

PATENT NO.        : 9,799,229 B2
APPLICATION NO.   : 13/713175
DATED             : October 24, 2017
INVENTOR(S)       : Wokurka et al.

Page 1 of 1

It is certified that error appears in the above-identified patent and that said Letters Patent is hereby corrected as shown below:

In the Claims

Column 32, Line 57, change "programmed is further" to --programmed and is further--
Column 33, Line 47, change "another aircraft" to --an aircraft--

Signed and Sealed this
Thirteenth Day of November, 2018

Andrei Iancu
*Director of the United States Patent and Trademark Office*